US011907056B2

(12) United States Patent
Quigley et al.

(10) Patent No.: US 11,907,056 B2
(45) Date of Patent: Feb. 20, 2024

(54) RUNTIME FAULT DETECTION TESTING IN DATA PROCESSING SYSTEM

(71) Applicant: Arm Limited, Cambridge (GB)

(72) Inventors: Eamonn Quigley, Cambridge (GB); Nicholas John Nelson Murphy, Cambridge (GB); Jussi Tuomas Pennala, Oulu (FI); Henrik Nils-Sture Olsson, Lund (SE)

(73) Assignee: Arm Limited, Cambridge (GB)

( * ) Notice: Subject to any disclaimer, the term of this patent is extended or adjusted under 35 U.S.C. 154(b) by 33 days.

(21) Appl. No.: 17/455,609

(22) Filed: Nov. 18, 2021

(65) Prior Publication Data
US 2022/0171668 A1 Jun. 2, 2022

(30) Foreign Application Priority Data
Nov. 27, 2020 (GB) ...................................... 2018707

(51) Int. Cl.
*G06F 11/07* (2006.01)
*G06F 11/14* (2006.01)
(Continued)

(52) U.S. Cl.
CPC ........ *G06F 11/079* (2013.01); *G06F 11/0766* (2013.01); *G06F 11/1479* (2013.01); *G06F 11/3668* (2013.01); *G06T 1/20* (2013.01)

(58) Field of Classification Search
CPC ............... G06F 11/079; G06F 11/0766; G06F 11/1479; G06F 11/3668; G06T 1/20
See application file for complete search history.

(56) References Cited

U.S. PATENT DOCUMENTS 3,623,011 A * 11/1971 Baynard, Jr. ....... G06F 11/2736
714/10
3,988,579 A * 10/1976 Bottard ................. G06F 11/273
714/25
(Continued)

FOREIGN PATENT DOCUMENTS

GB 2547252 A * 8/2017 ........... G06F 9/5066
GB 2600708 A * 5/2022 .......... G06F 11/2242
(Continued)

OTHER PUBLICATIONS

GB Combined Search and Examination Report dated Aug. 26, 2021, GB Patent Application GB2018707.6.

*Primary Examiner* — Matthew M Kim
*Assistant Examiner* — Indranil Chowdhury
(74) *Attorney, Agent, or Firm* — Vierra Magen Marcus LLP

(57) ABSTRACT

Disclosed herein is a data processing system comprising a processing unit operable to process data to generate a sequence of outputs, wherein the processing unit is configurable, when generating a sequence of outputs, such that the data processing for generating an output in the sequence of outputs will be performed within a respective processing period for the output. A controller for the processing unit is configured to cause the processing unit, when generating a sequence of outputs, during a respective processing period for at least one output in the sequence of outputs, to also undergo one or more fault detection test(s) such that both processing of data for the output and fault detection testing is performed during the respective processing period for the output.

9 Claims, 9 Drawing Sheets

*time_to_end_test = (total_tests - tests_executed) * time_per_test
**time_per_frame = time_to_end_test * frame_period / (diagnostic_test_interval- time_elapsed)

(51) Int. Cl.
    *G06F 11/36* (2006.01)
    *G06T 1/20* (2006.01)

(56) References Cited

U.S. PATENT DOCUMENTS

| | | | |
|---|---|---|---|
| 11,409,643 B2 * | 8/2022 | Zaykov | ............... G06F 11/3037 |
| 2017/0236244 A1 | 8/2017 | Price | |
| 2018/0074927 A1 | 3/2018 | Mori | |
| 2019/0050309 A1 | 2/2019 | Smith | |
| 2019/0056955 A1 | 2/2019 | Pennala | |
| 2019/0171538 A1 | 6/2019 | Gulati | |
| 2022/0036497 A1 * | 2/2022 | Bellamy | .................. G06F 21/84 |
| 2022/0036499 A1 * | 2/2022 | Bellamy | ............... G06T 1/0007 |

FOREIGN PATENT DOCUMENTS

| | | | | |
|---|---|---|---|---|
| WO | WO-03079190 A2 * | 9/2003 | .......... G06F 11/1479 |
| WO | WO-2006015945 A2 * | 2/2006 | .......... G06F 11/1438 |
| WO | WO-2022096890 A1 * | 5/2022 | ................ G06F 9/50 |

* cited by examiner

RUNTIME FAULT DETECTION TESTING IN DATA PROCESSING SYSTEM

CROSS-REFERENCE TO RELATED APPLICATIONS

This application claims priority pursuant to 35 U.S.C. 119(a) to United Kingdom Patent Application No. 2018707.6, filed Nov. 27, 2020, which application is incorporated herein by reference in its entirety.

BACKGROUND

The technology described herein relates to data processing systems including processing units (such as graphics processing units (GPUs)), and in particular to the operation of such data processing systems when being used in environments where the operation of the data processing system is required to be "functionally safe", such as may be the case for data processing systems being used for a human machine interface (HMI), such as in automotive or medical environments.

It is becoming increasingly common for data processing units and data processing systems to be used to process data for use in environments where it is important, e.g. for safety reasons, that the processing output is correct.

For example, a graphics processor and graphics processing system may be used to render images for displaying to a driver of a vehicle, for example for a cockpit display, or as a mirror replacement system. In such situations, any errors in the images rendered by the graphics processor can have safety implications for the driver of the vehicle and/or for other people in or in proximity to the vehicle, and so it is important that the images rendered by the graphics processor are correct.

The Applicants believe that there remains scope for improvements to the operation of data processing systems, for example when being used for such safety-critical applications.

DESCRIPTION OF THE DRAWINGS

Embodiments of the technology described herein will now be described, by way of example only, and with reference to the accompanying drawings, in which.

Like reference numerals are used for like features throughout the drawings, where appropriate.

DETAILED DESCRIPTION

Figure 1:
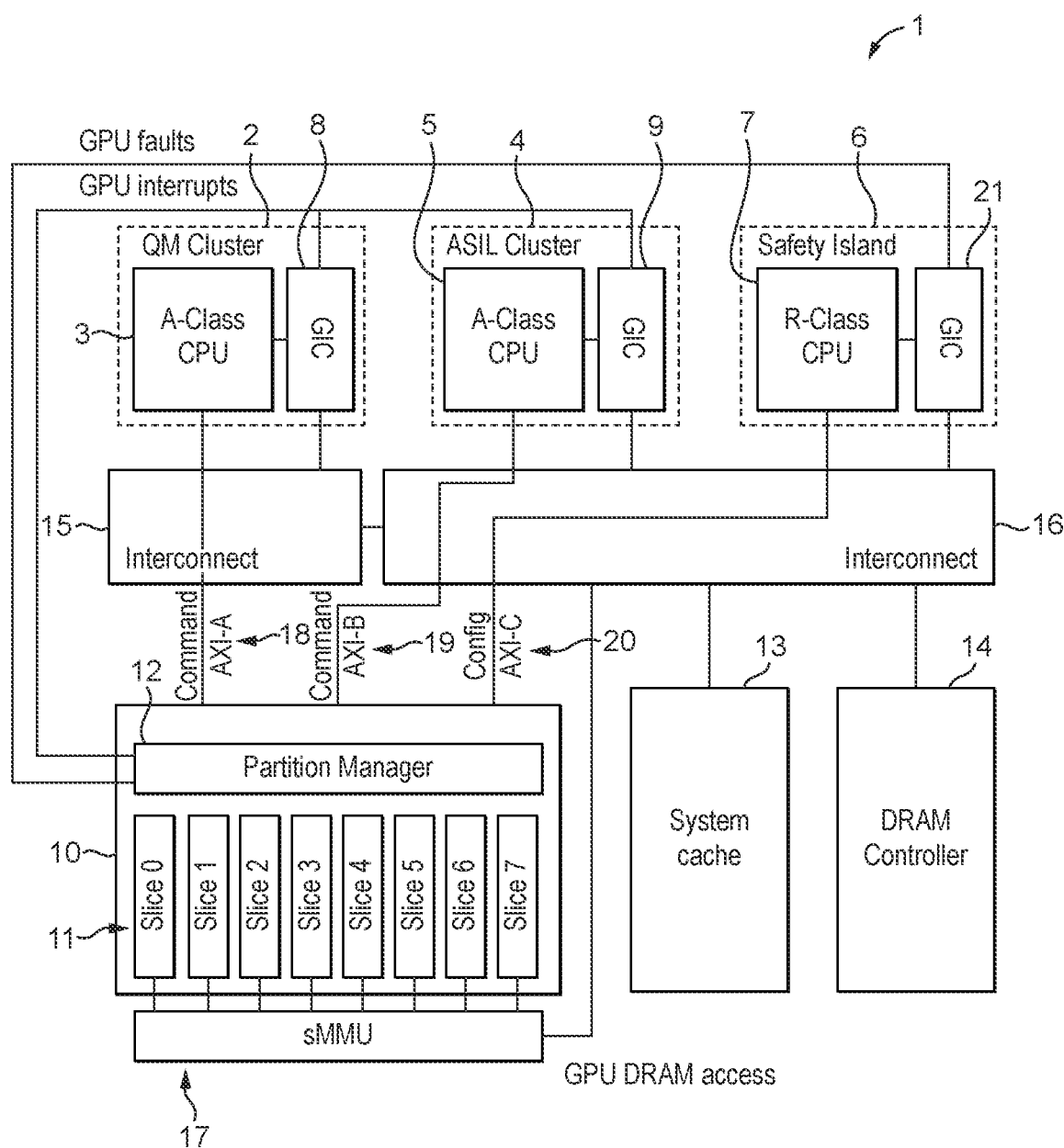
FIG. 1 shows schematically a data processing system according to an embodiment.

A first embodiment of the technology described herein comprises a data processing system comprising:

a processing unit operable to process data to generate a sequence of outputs, wherein the processing unit is configurable, when generating a sequence of outputs, such that the data processing for generating an output in the sequence of outputs will be performed within a respective "processing" period for the output; and a controller for the processing unit, wherein the controller is configured to cause the processing unit, when generating a sequence of outputs, during a respective processing period for at least one output in the sequence of outputs, to also undergo one or more fault detection test(s) such that both processing of data for the output and fault detection testing is performed during the respective processing period for the output.

A second embodiment of the technology described herein comprises a method of operating a data processing system, the data processing system comprising:

a processing unit operable to process data to generate a sequence of outputs;

the method comprising:

the processing unit, when generating a sequence of outputs:

for each output in the sequence:

performing the data processing for generating the output within a respective "processing" period for the output;

the method further comprising:

during a respective processing period for at least one output in the sequence of outputs:

causing the processing unit to also undergo one or more fault detection test(s) such that both processing of data for the output and fault detection testing is performed during the respective processing period for the output.

The technology described herein relates generally to data processing systems including a processing unit (or a set of one or more processing units) operable to process data to generate a sequence of outputs, wherein, for each output, there is a respective, allotted "processing" period within which the processing of data for the respective output should be performed (e.g. because new outputs in the sequence of outputs are required at a particular rate, e.g. to "refresh" a display). In other words, there is a sequence of such processing periods that are allocated for the generation of a corresponding sequence of outputs, and the processing unit is controlled to perform the processing for each output within its respective processing period.

In particular, the technology described herein relates to the scheduling of fault detection testing work for the processing unit. For instance, for safety-critical applications, such as data processing in automotive or medical environments, the processing unit must be periodically tested for faults. Runtime testing of the processing unit, e.g., by built-in self-test (BIST) or software library testing (SLT) can provide an efficient mechanism for testing the processing unit for faults (fault detection testing), but such testing cannot be performed at the same time as the data processing, e.g. such that the processing unit must be taken "offline" to undergo fault detection testing.

The technology described herein has recognised in this regard that the processing of data for a given output in the sequence of outputs may often complete before the end of its allotted processing period, in which case the processing unit may (in more conventional systems) be idle until the start of the next processing period.

The technology described herein thus further recognises that that this 'idle' time between the data processing for the current output completing and the start of the next processing period can beneficially be used for performing fault detection testing on the processing unit, e.g., to allow for a more efficient use of the processing unit's resource (and time), as will be explained further below.

That is, the technology described herein has recognised that fault detection testing of the processing unit can be interleaved with the processing of data by the processing unit for the sequence of outputs such that, during at least one of (and in an embodiment during multiple of) the processing periods, the processing unit also undergoes fault detection testing such that both processing and fault detection testing is performed during the same processing period.

In this way, the fault detection testing can be (and in an embodiment is) distributed across processing periods for multiple different outputs in the sequence.

For instance, the processing unit is typically (and in embodiments is) required to be tested at least once within a specified 'diagnostic test interval', e.g., which test interval may be specified by the application requiring the processing, e.g. based on the relevant functional safety standard. The fault detection testing thus in an embodiment involves completing a certain diagnostic test sequence (at least once) within the diagnostic test interval.

The technology described herein further recognises that where the fault detection testing is being performed alongside the data processing for an output in the manner described above, such that the fault detection testing is fitted in during the (same) respective processing period for the output, the entire diagnostic test sequence that is to be completed within the diagnostic test interval will typically not be able to complete within a single processing period. Thus, in the technology described herein the diagnostic test sequence is in an embodiment divided into a number of smaller fault detection tests (or sub-tests) which can be run separately (and in an embodiment independently) of one another, and these fault detection tests are then interleaved with the processing of data in the manner described above such that the overall test sequence is performed across multiple different processing periods.

Thus, in the technology described herein, fault detection testing work can be (and is) scheduled alongside and interleaved with the desired processing work, such that the processing unit also undergoes fault detection testing work within the (same) allotted processing period for the processing work, and such that test coverage is allowed to accumulate over the processing periods for multiple different outputs in the sequence of outputs. This approach may therefore provide a more efficient use of the processing unit's resource (and time), e.g. as the desired fault detection testing can be scheduled alongside the required data processing work, thus reducing (and in an embodiment avoiding) the need for the processing unit to stop (useful) data processing for the desired sequence of outputs for an extended period of time in order to complete the desired (or required) fault detection testing.

For example, in contrast, it would also be possible to stop processing work at the processing unit completely in order to allow the processing unit to be tested. In that case the entire diagnostic test sequence may be run in one go, with the processing unit being taken "offline" for the duration of the test sequence. However, this means that the processing unit is then unable to perform any other processing for the entire duration of the diagnostic test sequence.

Thus, the technology described herein may provide various benefits compared to other approaches.

The processing unit may be any suitable and desired form of processing unit. In an embodiment, the processing unit is a processing unit that is intended to perform a particular form or forms of processing operation, and in particular that, in an embodiment, functions as a hardware accelerator for a particular form or forms of processing operation. Thus the processing unit may, for example, be any suitable and desired form of processing unit and accelerator, such as a video processing unit, a machine learning accelerator, a neural network processing unit, etc.

In an embodiment, the processing unit is a graphics processing unit (graphics processor, GPU). In this case, the graphics processing unit of the data processing system can comprise any suitable and desired form of graphics processing unit. The graphics processing unit may perform any suitable and desired form of graphics processing, such as rasterisation-based rendering, ray-tracing, hybrid ray-tracing etc.

This being the case, the technology described herein will be described below primarily with reference to the processing unit being a graphics processing unit. However, unless the context requires otherwise, the described features of the technology described herein can equally and analogously be applied to and used for other forms of processing unit, and the technology described herein extends to such systems using forms of processing unit other than graphics processing units.

The technology described herein can be used for all forms of output that data processing units may output. Thus, in the case of graphics processing units, it may be used when generating frames for display, render-to-texture outputs, etc. However, the technology described herein can equally be used where the graphics processing units are to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations.

In embodiments, the respective processing periods for the outputs in the sequence of outputs are based on a rate at which the outputs are required to be refreshed. For instance, in the case where the output comprises a frame for display, the respective processing period associated with an output (e.g. frame) may, e.g., and in an embodiment does, correspond to a desired refresh rate at which the frames are to be updated for display. In that case each output (e.g. frame) may be allocated the same fixed processing period, e.g. determined by the desired frame rendering rate of the processing unit. For example, where the frames are to be displayed at 60 frames per second (fps), each frame may be allocated a respective processing period of 16.7 milliseconds within which the data processing for the frame can be performed, e.g. in order to update the frames for display at the desired rate.

However, other arrangements would be possible and different outputs (e.g. frames) may be allocated different associated processing periods, e.g. which may be specified in advance by the application and/or determined for the processing unit 'on-the-fly'.

In the technology described herein, for at least some of the processing periods, the processing unit is configured to perform both data processing for the respective (current) output and one or more fault detection test(s). The processing unit is thus in an embodiment switched from processing data for the output to undergoing one or more fault detection test(s) (although it would also be possible in some cases, e.g., at least in embodiments where a certain "fixed" portion of the processing period is reserved for fault detection testing, as will be explained further below, to configure the processing unit to undergo the fault detection tests first, and then switch to processing data, e.g. when the fault detection tests have completed).

In particular, and as mentioned above, in embodiments, the fault detection testing relates to a diagnostic test sequence comprising a plurality of the fault detection tests (or sub-tests). Thus, in embodiments, the fault detection tests can be (and are) distributed across the processing periods for multiple outputs in the sequence of outputs such that the overall diagnostic test sequence is completed within a defined diagnostic test interval.

The actual testing of the processing unit can be performed as desired. In one embodiment, and typically, when a processing unit is being tested, the processing unit is not available to perform, and does not perform, any processing for the (useful) data output that is being generated. Thus when a processing unit is to be tested, the controller will cause the processing unit to stop any processing for the data output and cause the processing unit to be fault detection tested instead.

In this case, depending upon how the fault detection testing is performed, a processing unit may be taken "offline" (put in a different hardware state, unavailable to software) while being tested (e.g. in the case of built-in self-testing (BIST)), or a processing unit under test may remain in its "mission mode" hardware state whilst executing the operations designed to test its function, but would not be available for normal operation (for "mission mode" software) (as it will be executing non-mission mode software for the testing) (e.g. in the case of STL (software test library) testing).

Various arrangements are contemplated for controlling the processing unit to change between processing and fault detection testing work and to ensure the overall diagnostic test sequence is completed (in the appropriate time period).

For instance, in one embodiment, rather than scheduling fault detection testing within a processing period only during any remaining 'idle' time after the processing work has completed, e.g. in the manner described above, a fixed testing window may be defined for at least some of (or each of) the processing periods, e.g. such that a certain fraction of the processing period, such as 10% or 25% of the processing period, is reserved for fault detection testing. For example, in this case the size of the fixed testing window for a processing period may be determined based on the (expected) duration of the fault detection tests (sub-tests), e.g. such that one or more, e.g. an integer number of, fault detection tests can be completed within the fixed testing window.

The size of the fixed testing window is in an embodiment also selected, e.g. based on the average processing time for generating an output, such that it is expected that at least on average the processing of data for the current output (for the processing period in question) will complete before the start of the fixed testing window. When all of the processing of data for the current processing period (for the current output) has completed before the start of the fixed testing window, the processing unit is then free to undergo fault detection testing during the fixed testing window without there being any need to interrupt the processing work (since the processing period for the current output has already completed).

However, it may not always be the case that the processing completes before the start of the fixed testing window, e.g. as the processing for a given output may take longer than expected, etc., and in some cases the processing for the current output (for the processing period in question) will not be complete by the start of the fixed testing window. In this case, even if the processing work for the current output (for the processing period in question) has not completed, the processing work is in an embodiment interrupted (stopped) to allow the fault detection testing to be performed, e.g., and in an embodiment, by 'suspending' the processing mid-output, e.g. such that the processing work can subsequently (once the fault detection testing has completed) be resumed from the point at which it was suspended, e.g. without having to restart the processing work for the output from the beginning.

Thus, in embodiments, a fixed testing window is defined, for at least some respective processing periods, such that (even) when the processing of data for an output has not completed before the start of the fixed testing window defined for the output's respective processing period, the processing for the output is interrupted (stopped, e.g. suspended) such that the processing unit can perform the fault detection test(s).

In this way it can be readily ensured that the overall diagnostic test sequence will be completed within the desired diagnostic test interval. For instance, by dividing the time required for the overall test sequence by the number of processing periods covering the diagnostic test interval, it can be determined what fraction of each processing period should be reserved for fault detection testing in order to complete the overall test sequence within the diagnostic test interval.

However, in another embodiment, the fault detection testing is performed more opportunistically, with fault detection testing being fitted in alongside processing work as and when possible. For example, priority may be given (at least initially) to processing work such that fault detection testing is only performed during a given processing period if all of the processing work for the respective output associated with the processing period has completed, e.g. in any remaining 'idle' time, as mentioned above.

In that case, because the time taken for the processing for an output to complete may vary from output to output, the number of fault detection tests performed in the different processing periods will be variable. This means that the time taken to complete the diagnostic test sequence will then be unpredictable. In some cases that might be tolerable. However, as mentioned above, most safety-critical devices are required to meet a specific diagnostic test interval, e.g. such that all of the fault detection tests for the overall diagnostic test sequence for testing the processing unit must be completed (at least once) within the specified diagnostic test interval.

To address this, in an embodiment (at least) where the fault detection testing is being performed more opportunistically, the progress of the fault detection testing (e.g. the number of fault detection tests performed so far) is tracked, in an embodiment to determine how far along the diagnostic test sequence the fault detection testing has reached, with, in an embodiment, priority then being given to fault detection testing as and when necessary to ensure that the diagnostic test sequence can be completed in time.

Thus, in embodiments, the controller is configured to dynamically control the processing unit to perform processing work or fault detection testing to ensure that the fault detection testing is completed within a specified diagnostic test interval.

In an embodiment this is done by keeping track of the progress of the fault detection testing and how long there is left in order to complete the fault detection testing (how long until the end of the diagnostic test window) and determining whether or not the fault detection is expected to complete in time, e.g. based on the current rate of progress. If the expected time to complete the fault detection exceeds the desired diagnostic test window the fault detection testing may thus be prioritised.

For instance, in embodiments, for each processing period (for each output), an estimate may be made of the time to complete the fault detection testing which estimate can then be compared against the remaining time until the diagnostic test interval expires. The time allocated for fault detection testing (the number of fault detection tests) for the processing period is then in an embodiment set accordingly based on this comparison, e.g. such that the controller can trigger a change to fault detection testing at an appropriate time (even if the processing has not yet completed).

For example, in an embodiment, a determination is made, for each processing period, of the (estimated) fault detection testing time required per output in order to meet the diagnostic test interval. So long as the remaining time in the processing period is greater than the determined fault detection testing time required per output, priority can then be (and is) given to processing work. However, when the remaining time in the processing period is equal to (or less than) the determined fault detection testing time required per output, priority is then given to fault detection testing work, e.g. and the processing work is interrupted (stopped, e.g. suspended), if it has not completed.

This could also be done using a fault detection testing 'progress value', e.g., and in an embodiment, representing the number of fault detection tests performed so far (and hence the progress along the diagnostic test sequence). This fault detection testing progress value can then be compared with one or more, in an embodiment plural, threshold values to determine whether to give priority to processing work or fault detection testing work.

Thus, in an embodiment, the controller may give priority to processing work so long as the accumulated number of fault detection tests exceeds a (first) threshold, whereas the controller gives priority to fault detection testing work when the accumulated number of fault detection tests falls below the (first) threshold.

For example, when the fault detection testing progress value is above a (first) threshold, e.g. such that if fault detection testing continues at the current rate the fault detection testing will complete within the diagnostic test interval, priority may be given to processing work, with fault detection testing work being performed opportunistically in any remaining time after the processing work has completed.

On the other hand, when the fault detection testing progress value is below the (first) threshold, e.g. such that if fault detection testing continues at the current rate the fault detection testing will not complete within the diagnostic test interval, priority may then be given to fault detection testing work.

For instance, in that case the processing work may be interrupted, e.g. suspended, such that the next processing period (or processing periods) is dedicated to fault detection testing until the fault detection testing progress value is above the (first) threshold in which case priority may be given back to processing work.

However, it would also be possible, rather than stopping (e.g. suspending) processing work completely, to try to reduce the time required for the processing for the next processing period (output) to free up more time for fault detection testing, e.g. by accelerating the processing work, e.g. by causing the processing unit to generate a lower quality (e.g. lower resolution) output. As another example, rather than (or as well as) reducing the time required for the processing, the rate at which the outputs are required to be updated (e.g. for display) may be reduced (e.g. from 60 fps to 30 fps), to effectively increase the processing period available for each output, and again free up more time for fault detection testing. Various other arrangements would be possible in this regard.

In an embodiment, there may be multiple threshold values such that when the fault detection testing progress value is below a (first) threshold value the processing work is accelerated to give more time for fault detection testing, or the rate at which the output is updated is reduced, etc., whereas when the fault detection testing progress value is below a further (second) threshold value the processing work is interrupted (stopped, e.g. suspended), e.g. such that the next processing period is dedicated to fault detection testing.

Whilst in the example given above a progress value representing the accumulated number of fault detection tests is compared with a threshold, e.g. such that priority can be given to processing work so long as the progress value is above the threshold, it will be appreciated that the progress value may equivalently be defined such that priority should be given to processing work when the progress value is below the threshold value (e.g. by suitably defining the progress value in terms of the number of fault detection tests yet to be completed, etc.).

In cases where the processing work for an output has to be interrupted (stopped) before it can complete, or where a processing period is used only for fault detection testing such that no processing work is performed for the respective output associated with the processing period, e.g. to ensure the diagnostic test sequence can complete, the respective output may not be completed within its allotted processing period.

In that case when the processing work for the current output is interrupted (stopped) the processing unit may provide a partial (e.g. incomplete) output or a null output, e.g. depending on the processing work that has been completed to that point. Or, in some embodiments, the previous output may, e.g., be re-used. For example, where the output comprises a frame for display, it may be possible to re-display the previous frame without significant penalty, e.g. so long as the (suspended) processing work is resumed relatively quickly after the fault detection testing has completed, e.g. especially as the frames are typically generated at sufficiently fast rates that errors in a single frame may be barely perceptible.

As mentioned above, when the processing work for an output is interrupted (stopped) mid-way through an output, or sequence of outputs, this is in an embodiment done by 'suspending' the processing work in such a manner that the processing work can subsequently (e.g. after the current instance of fault detection testing has completed) resume from the point in the processing for the output(s) at which the processing work was suspended. In this way the generation of the output can be completed by resuming the processing work appropriately, e.g. and without having to re-do the processing work for the output from the beginning. This means that when the processing for an output is not completed within its allotted processing period (because the processing was interrupted (suspended) to allow the processing unit to undergo fault detection testing), the processing work can be completed when the processing unit is next able to do so, such that even if the output is delayed (e.g. such that the output cannot be (e.g.) displayed), the processing for the output can still be completed in an efficient manner (without having to re-do the processing from the beginning) when the processing for the sequence of outputs is resumed.

However, various arrangements would be possible in this regard, e.g. depending on the output in question.

Thus, in the technology described herein, when generating a sequence of outputs, during at least one, and in an embodiment during multiple of, the respective processing periods for the outputs, the processing unit is caused to change between performing processing work and undergoing fault detection testing work. As mentioned above, in embodiments, when a processing unit is being tested, the processing unit is not available to perform, and does not perform, any processing for the (useful) data output that is being generated. That is, the processing unit is in an embodiment be selectively operated within a single processing period to either perform processing work or to undergo fault detection testing, but cannot do both in parallel.

In some embodiments, the processing unit may be configured to perform both types of work during each and every one of the processing periods (e.g. if there is a fixed testing window defined for the processing periods such that this is the case). In other embodiments, the processing unit may perform a mixture of work in some processing periods and in other processing periods only do one type of work, e.g. depending on which work is given priority (e.g. if the fault detection testing is performed more opportunistically).

The changes between processing work and fault detection testing are in an embodiment triggered by the controller. In embodiments, when the controller triggers fault detection testing (a set of one or more fault detection test(s)), the fault detection testing then runs incrementally, with the fault detection tests (or sub-tests) in an embodiment being performed one after another (in an embodiment without input from the controller), e.g., and in an embodiment, until the controller triggers a change back to the desired processing work for generating the (next) output. However, in general the controller could be configured to schedule the fault detection test(s) in a more or less sophisticated manner as desired. For example, it would also be possible for the controller to actively schedule the individual functional safety tests, e.g. based on the available time for testing in the processing period in question.

The fault detection testing work may comprise any suitable and desired fault detection testing. In an embodiment, the fault detection testing involves a built-in self-test (BIST). The built-in self-test (BIST) typically, and in an embodiment, comprises testing the logic elements (e.g. gates, flip-flops, etc.) using suitable scan chains (Logic-BIST, "LBIST" testing) and also testing the memory elements (Memory-BIST, "MBIST"). For example, during manufacture, a number of scan chains and/or memory testing interfaces may be built into the processing unit to allow the processing unit to be tested for quality control purposes. These scan chains and/or memory testing interfaces can then be re-run during use in order for fault detection testing purposes. In another embodiment the fault detection testing may use software test library (STL) testing. Thus, in embodiments, the fault detection testing may use, and may in an embodiment use both: built-in self-testing (BIST); and software test library (STL) testing.

As mentioned above, the fault detection testing in an embodiment relates to a diagnostic test sequence that is to be completed within a diagnostic test interval, which is in an embodiment a fixed diagnostic test interval, in an embodiment specified for the application requiring the processing, e.g. based on the relevant functional safety standard. In an embodiment the diagnostic test sequence is divided into a plurality of smaller fault detection tests (or sub-tests), and it is these fault detection tests that are scheduled within the processing periods for the outputs in the technology described herein, so that the diagnostic test sequence is performed as a series of smaller test 'chunks'.

The division of the diagnostic test sequence into the fault detection tests (or sub-tests) can be performed in any suitable fashion, as desired. For example, in embodiments, the diagnostic test sequence may be divided into a plurality of equally-sized fault detection (sub)tests, with the size (duration) of each of the fault detection (sub)tests being selected, e.g., such that the processing unit can perform one or more complete sub-tests within at least some of the processing periods (e.g., and in an embodiment based on an expected or average 'idle' time within a processing period for an output, etc.). However, it would also be possible to divide the test sequence into fault detection tests of different durations.

For example, a typical BIST test sequence (which may comprise an LBIST and/or MBIST sequence) may comprise a large number (e.g. a million) of test vectors, which test vectors can (in principle) be run independently. The BIST test output may then comprise an accumulated result, e.g. in the form of a checksum, generated from the processing of (all of) the test vectors. For example, the accumulated result (e.g. checksum value) may be updated after each test vector, and the accumulated result then checked, e.g. by comparing it with a known, e.g. previously calculated, reference value at the end of a test. The fault detection tests in the technology described herein may therefore comprise respective sets of one or more test vector(s). Each set of one or more test vectors may thus comprise an individual fault detection test (or sub-test) according to the technology described herein which must in an embodiment be run to completion when it is triggered in order to check the associated testing state (e.g. checksum value).

For instance, it would be possible for each test vector to be treated as an individual fault detection test for the purposes of the technology described herein. In that case, where the fault detection tests are fitted alongside the processing work, within the (same) processing periods, it may be required to check the accumulated result (e.g. checksum, or testing 'state') on a per testing vector basis, such that a reference value would be required for each test vector.

However, in embodiments, sets of plural test vectors are grouped together into individual fault detection tests (sub-tests), and the testing 'state' (e.g. checksum value) is checked for such sets of test vectors. Thus, the overall test sequence may be divided into a number of sets each containing one or more test vectors, e.g., and in an embodiment such that each set contains substantially the same number of test vectors. The accumulated value (checksum value) is then updated after each test vector is processed, but is only checked once the set of test vectors has completed. This means reference values need only be stored and checked for the sets of test vectors, e.g. rather than for each test vector, which may be more efficient.

In that case, if a fault detection test (set of test vectors) that is triggered for the current processing period cannot complete within the processing period, the fault detection test may be interrupted (stopped) and the fault detection test (set of test vectors) then re-run from the start, e.g. as and when next possible, e.g. in the next available processing period. Alternatively, the fault detection test (set of test vectors) may be allowed to continue into the next processing period (with the processing work for the processing period correspondingly being delayed until the fault detection testing has completed). The controller will generally determine how and when to change between processing and testing work.

Thus, in embodiments, an overall test sequence is divided into a plurality of smaller fault detection tests (sub-tests), which fault detection tests must be run in one go. In that case, when a fault detection test (sub-test) that is started within a respective processing period cannot complete within the processing period, the fault detection test (sub-test) may be interrupted, e.g. and then rescheduled in another (e.g. the next available processing period). Alternatively, the fault detection test (sub-test) may be allowed to continue into the next processing period to allow the fault detection test (sub-test) to complete before the controller switches the processing unit back to processing work.

Depending on the nature of the fault detection testing the individual fault detection tests may or may not need to be performed in order. If the fault detection tests need to be performed in order, the fault detection tests should therefore be scheduled according to that order (and this is therefore done). However, when the fault detection tests can be performed out of order, and especially when the fault detection tests may have different sizes, the controller may in such cases be configured to perform a more 'intelligent' scheduling, e.g. such that a selection is made as to which fault detection test to perform next, e.g. depending on the available time for testing (e.g. such that the largest outstanding fault detection test is scheduled first, or such that available time for testing is as fully utilised as possible, etc.).

When a processing unit has been subjected to the fault detection testing (e.g. BIST), then if the processing unit passes the fault detection testing (which can be determined and set in any suitable and desired manner), then the processing unit, etc., can remain operating in its normal manner.

On the other hand, if the processing unit fails the fault detection testing, then an (appropriate) fault detection event action is in an embodiment performed. This may be done, e.g., by the controller, and/or by the test circuit (unit). This could comprise, for example, performing some form of error recovery operation, and/or reporting the fault to another component of the system, such as the controller, for handling. This in an embodiment comprises taking action to protect against the consequences of the detected fault(s).

In the event of a fault, the processing unit(s) may, e.g., be reset, and/or may enter a particular, e.g. preset, "safe" mode of operation. The operation in the event of fault detection testing being failed may, e.g., be specified for the data processing system in question (e.g. there may be a predefined fault recovery operation), and/or able to be set in use.

The data processing system may include a single processing unit which may comprise a single or plural processing cores.

It would also be possible for the processing unit to form part of a set of one or more, in an embodiment plural, processing units that may, e.g., be arranged in a group.

For instance, although the technology described herein has been described above with reference to the fault detection testing of a given processing unit, in an embodiment, the data processing system comprises a group of plural (similar) processing units (e.g. a plurality of graphics processing units), and each processing unit is able to be, and in an embodiment is, fault detection tested in the manner of the technology described herein.

In this case, each processing unit in the group is in an embodiment the same type of processing unit, but the individual processing units may be the same or differ from each other, e.g. in terms of their processing resources and capabilities.

In one such embodiment, at least some of the processing units can operate in combination with at least one other processing unit of the plurality of processing units to generate a data processing output, with some, and in an embodiment all, of the processing units also being operable to generate a data processing output on their own (i.e. independently of any other processing unit of the plurality of processing units).

In an embodiment, the processing units are partitionable into one or more sets ("partitions") of one or more processing units, wherein each set (partition) of one or more processing units is operable to generate a data processing output independently of any other set (partition) of one or more processing units of the one or more sets (partitions) of one or more processing units.

Where a processing unit is operating in combination with at least one other processing unit of the plurality of graphics processing units to generate the same data processing output, then the processing units of the set (partition) in an embodiment operate in a "master-slave"-type arrangement, with one processing unit of the set (partition) operating as a master (primary) processing unit controlling processing operations on one or more other processing units that are each acting as a slave (secondary) processing unit.

In an embodiment, each processing unit can be, and is, subjected to the fault detection testing on its own, and independently of any other processing units of the group. Thus, in an embodiment, the fault detection testing can be triggered and performed for individual processing units on their own, and independently of the testing of any other processing unit. For example, in embodiments, multiple processing units (or sets/partitions thereof) can be (and in an embodiment are) tested in parallel. Similarly, where a processing unit comprises a plurality of execution units, such as a plurality of shader (programmable processing) cores, the execution units can be (and in an embodiment are) tested in parallel.

In one embodiment, the fault detection testing is triggered for a partition of the processing units (and on a partition-by-partition basis), with the system then operating when a partition is triggered for fault detection testing, to test all of the processing units of the partition (but in an embodiment independently of each other).

In an embodiment, the testing is done such that each of the processing units in the group is (fully) tested at least once within a desired (fault detection) testing interval (diagnostic test interval) (for the processing unit in question). The (diagnostic) test interval may be the same for all the processing units/partitions or different processing units/partitions may have different (diagnostic) test intervals.

The fault detection testing may (otherwise) be done as desired. For example, some or all of the processing units/partitions could be tested at the same time, or different processing units/partitions could be tested at different times (i.e. such that not all of the processing units in the group are being tested at the same time).

In some embodiments, processing work may be moved between processing units/partitions to facilitate fault detection testing. For example, in embodiments, the data processing system includes a plurality of processing units arranged in a group, wherein the plurality of processing units arranged in the group are themselves able to be configured as respective partitions of processing units within the group, with each partition comprising a subset of one or more of the processing units of the group, and the data processing system is operable to move processing from a first partition to another partition to allow the first partition to undergo fault detection testing. Correspondingly, in embodiments, the method comprises moving processing work from a first partition to another partition to allow the first partition to undergo fault detection testing.

However, other arrangements would be possible.

As discussed above, when a given processing unit/partition is to be tested, the processing unit/partition will typically (and in embodiments) not be available for generating a data processing output, and the processing work for the output to be generated by the processing unit/partition may have to be interrupted or stopped (where that processing has still be completed when the testing falls to be performed). In the case where the system includes plural processing units, then the interrupted/stopped processing work may be, and is in an embodiment, moved to another one of the processing units/partitions of the group of plural processing units to allow the processing work to be completed whilst the original processing unit is being tested (provided that there is another processing unit/partition with capacity to perform the work). Thus, in embodiments, the data processing system includes a plurality of processing units, e.g. arranged in a group, e.g., and in an embodiment, wherein the plurality of processing units arranged in the group are themselves able to be configured as respective partitions of processing units within the group, with each partition comprising a subset of one or more of the processing units of the group, and when the controller causes processing work for a particular one of the processing units (or e.g. partition) to be interrupted so that the processing unit can perform fault detection testing, the processing work for the processing unit (e.g. partition) that is performing the fault detection testing is moved to another processing unit (or e.g. another partition).

The controller that controls the processing unit to undergo the fault detection testing can be any suitable and desired controller that can trigger fault detection testing of the processing unit. In an embodiment, the controller is a controller that is also operable to control access to the processing unit by virtual machines that require processing operations by the processing unit.

Thus, in an embodiment the system includes a controller, in an embodiment in the form of a software arbiter, that is operable to control access by virtual machines that require processing operations to the processing unit, and that controller (arbiter) for the processing unit controls the fault detection testing of the processing unit. Thus for a group of processing units an arbiter for that group of processing units in an embodiment causes the group of processing units to be subjected to the appropriate fault detection testing.

The actual fault detection testing of a processing unit can be performed by any suitable and desired testing element (circuit) of the data processing system. In an embodiment, the data processing system correspondingly includes appropriate testing circuits (a testing unit) for this purpose. These testing circuits need not be, and in an embodiment are not, part of the controller and/or the processing unit(s) themselves, but are otherwise provided as part of the data processing system. Thus the operation in the manner of the technology described herein to perform fault detection testing for, e.g., a processing unit, will comprise the controller triggering the appropriate testing of a, e.g., processing unit, but the testing itself will be performed by a separate testing circuit of the data processing system (e.g. an appropriately configured BIST unit or BIST units of the data processing system). Where the processing unit is desired (or required) to undergo multiple different types of fault detection testing, e.g. such as both LBIST and MBIST testing, (logically) independent testing circuits may be provided for (each of) the different types of fault detection testing (e.g. separate LBIST and MBIST circuits), e.g. such that a processing unit can undergo multiple different types of testing in parallel.

In an embodiment, the operation in the manner of the technology described herein can be selectively activated for a given output to be generated by a processing unit. This would then allow this operation to be used where desired (e.g. in the case of use in a safety critical environment where runtime testing is desired), but avoid its use in those circumstances where it is not required.

This operation may be controlled, e.g., by a (software) driver for the processing unit, or an appropriate hypervisor, or "arbiter" which controls access to the processing unit. Thus, in an embodiment, the processing unit can be selectively configured to operate in the manner of the technology described herein, e.g., and in an embodiment, on an output-by-output basis.

The, e.g. driver, can recognise when operation in the manner of the technology described herein is required in any suitable and desired manner. For example, and in an embodiment, an application that requires processing by the processing unit could be configured to and operable to be able to indicate when processing in the manner of the technology described herein is required. This could be achieved, for example, and in an embodiment, by providing an appropriate API extension, whereby an application programmer can indicate that operation in the manner of the technology described herein is desired.

Other arrangements would, of course, be possible.

Subject to the requirement to be operable in accordance with the technology described herein, the processing unit (or units) of the data processing system may otherwise comprise any or all of the normal components, functional units, and elements, etc., that such a processing unit may comprise.

Each processing unit may have the same set of functional units, etc., or some or all of the processing units may differ from each other.

Thus, in the case of graphics processing units, for example, each graphics processing unit in an embodiment includes one or more execution units, such as one or more shader (programmable processing) cores. In an embodiment, each graphics processing unit includes a plurality of shader cores, such as three or four shader cores.

In an embodiment, the graphics processing units (and thus the graphics processing system) are tile-based graphics processing units, and one or more of (e.g. all of) the graphics processing units also includes a tiling unit (a tiler or hierarchical tiler).

The processing unit may be operated to perform processing under the control of a host processor (e.g. CPU). The host processor can be any suitable and desired host processor of a data processing system. The host processor can, and in an embodiment does, execute applications that may require data processing by the processing unit, and includes and executes an appropriate driver (e.g. including a compiler) for the processing unit, such that it can prepare commands, instructions, data structures, etc., for execution and use by the processing unit to perform desired data processing operations in response to requests for data processing operations from applications that are executing on the host processor.

The processing unit in an embodiment also comprises one or more of, and in an embodiment all of: a management unit (e.g. a job manager) that provides a host processor (or virtual machine) (software) interface for the processing unit and is also operable to divide a data processing task allocated to the processing unit into subtasks and to distribute the subtasks for execution to the execution unit or units of the processing unit; a cache (e.g. a L2 cache) that provides an interface to an external (main) system memory of the data processing system, and a memory management unit (MMU) (however, appropriate memory management units could also or instead be located externally to the processing unit or units, if desired).

Each processing unit will also comprise an appropriate communications network for providing communications between the various units of the processing unit, such as memory transactions between execution units and/or the cache of the processing unit, subtask control traffic between the job manager and execution units and so on.

Other configurations of graphics processing unit would, of course, be possible.

As well as the processing units, controller, etc., necessary for operation in the manner of the technology described herein, the data processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.).

In embodiments, where the data processing system includes a plurality of processing units (which may either be operated independently of each other or in combination), each processing unit can in an embodiment receive processing instructions, e.g. from a (driver that is executing on a) host processor or virtual machine that requires the data processing output, and carry out received instructions independently. For example, each processing unit in an embodiment has an associated (task) management circuit (e.g. job manager) that can provide a suitable software interface for the processing unit when operating in standalone mode. In an embodiment at least some of the processing units can also be operated in combination, e.g. in a master-and-slave arrangement.

The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in an embodiment includes appropriate (system) memory for storing the data used by the processing units when carrying out processing and/or for storing the data generated by the processing units as a result of carrying out processing. Different groups of processing units may be configured to be connected to the same (system) memory, or separate system memories may be provided for different groups (again, this may be beneficial for safety and/or security purposes).

Correspondingly, different groups of the processing units may be connected to the external system memory via the same or different memory interconnects.

Thus, in an embodiment, the data processing system includes the processing units, and one or more host data processing units (processors) (e.g. central processing units) on which one or more virtual machines execute (in an embodiment together with one or more drivers (for the processing units)).

In an embodiment, the data processing system and/or data processing units comprise, and/or are in communication with, one or more memories and/or memory devices that store the data described herein, and/or that store software for performing the processes described herein.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Thus, a further embodiment of the technology described herein comprises a non-transitory computer readable storage medium storing software code that when executing on a data processor performs a method according to any of the embodiments described above, in particular a method of operating a data processing system, the data processing system comprising: a processing unit operable to process data to generate a sequence of outputs; the method comprising: the processing unit, when generating a sequence of outputs: for each output in the sequence: performing the data processing for generating the output within a respective "processing" period for the output; the method further comprising: during a respective processing period for at least one output in the sequence of outputs: causing the processing unit to also undergo one or more fault detection test(s) such that both processing of data for the output and fault detection testing is performed during the respective processing period for the output.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described with reference to FIGS. 1 to 9.

In an example embodiment the data processing system comprises a plurality of (graphics) processing units, with each processing unit being able to be selectively fault detection tested in the manner of the present embodiments.

In this embodiment, the data processing system is in the form of an automotive system-on-chip (SoC).

As shown in FIG. 1, the data processing system 1 of this embodiment comprises three CPU (central processing unit) clusters: a first "quality managed" (QM) cluster 2, comprising a CPU 3 running "quality managed" software (thus the CPU 3 does not have automotive safety features); a second, "ASIL" (automotive safety integrity level) (functional safety, FuSa) cluster 4, comprising a CPU 5, but this time running appropriately safety certified software; and a "safety island" cluster 6, comprising a CPU 7 that runs safety certified software for configuration of the system and fault handling.

As shown in FIG. 1, each CPU cluster also comprises its own general interrupt controller (GIC) 8, 9, 21.

As well as the CPU clusters, the system also comprises a "graphics processing" cluster 10, comprising a set 11 of graphics processing units ("slices"), that are able, as will be discussed further below, to provide processing functions to virtual machines executing on the QM cluster 2 and the ASIL cluster 4.

In this example, the set 11 of graphics processing units comprises eight graphics processing units (slices 0-7, where each slice is a graphics processing unit of the set), but other numbers of graphics processing units would, of course, be possible. As will be discussed further below, in this embodiment the graphics processing units (GPUs) can be operated in various modes, namely either as "standalone" GPUs, or as one or more linked sets of a primary (master) and one or more secondary (slave) GPUs.

The graphics processing units 11 also have associated with them (as part of the graphics processing cluster 10), a management circuit (partition manager) 12.

As shown in FIG. 1, the system supports three separate communications bus connections for the graphics processing cluster 10: a first communications bus 18 that may be used, for example, for non-safety critical traffic and thus by the QM cluster 2; a second bus 19 that may be a safety-critical/secure bus and used, for example, for safety critical traffic and thus by the ASIL cluster 4; and a third bus 20 that may be a safety-critical/secure bus but that also has privilege restrictions (i.e. can only be accessed by appropriately privileged bus masters) and that is used for configuration communications only by the safety island 6.

The system also includes an appropriate system cache 13, DRAM controller 14, interconnects 15, 16 and a system memory management unit (sMMU) 17 (that, e.g., provides second level address translation separating safe and non-safe address spaces and isolates the memory access for each virtual machine based on the per-access window stream IDs) for the graphics processing cluster 10.

There may, of course, be functional units, processors, system elements and components etc., that are not shown in FIG. 1.

The management circuit (partition manager) 12 for the graphics processing units 11 is operable to configure and set a configurable communications network that sets the communications paths between the different graphics processing units (slices) 11, and also how the (and which) graphics processing units communicate with the QM cluster 2 and the ASIL cluster 4 (and in particular which of the buses 18, 19, can be used to communicate with the respective graphics processing units). In particular, it can set that communications network to configure the graphics processing units (slices) 11 into, in this embodiment, two different groups of the graphics processing units, one group for the QM cluster 2 (and coupled to the bus 18 for that cluster), and one group for the ASIL cluster 4 (and coupled to the bus 19 for that cluster).

As well as being able to set the configurable communications network to subdivide the graphics processing units into different groups, the management circuit (partition manager) also supports and can configure the organisation of the graphics processing units of a group into one or more independently allocatable partitions (subsets) of the graphics processing units (slices) of the group.

The management circuit (partition manager) 12 also provides a set of "access windows" in the form of communications interfaces whereby a virtual machine may access and control a given partition of the graphics processing units. Each such access window comprises, in the present embodiments, a set of (communication) registers having a corresponding set of physical addresses that can be used to address those registers.

These access windows also provide the mechanism whereby a virtual machine may communicate with an arbiter (with the arbiter for the group of graphics processing units that the virtual machine is to used), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition. The virtual machine-arbiter interface is separate to the virtual machine-graphics processing unit partition interface.

Thus, the graphics processing cluster 10 effectively provides a set of graphics processing resources, comprising the graphics processing units (slices) 11, and the partitions and access windows supported by the management circuit 12, which resources can be subdivided into plural (in the present embodiment two) graphics processing resource "groups", each containing one or more of the graphics processing units (slices) and having associated with them one or more of the independently allocatable partitions of the graphics processing units and one or more "access windows".

In the present embodiment, the management circuit (partition manager) 12 supports the subdivision of the graphics processing units 11 into two different groups (one for use by the QM cluster 2, and the other for use by the ASIL cluster 4), into a maximum of four partitions, and provides a set of 16 access windows for virtual machines to communicate with the partitions of the graphics processing units. Other arrangements would, of course, be possible.

In the present embodiments, the configuration of these graphics processing resources into the respective groups is done by the management circuit (partition manager) 12 under the control of a (privileged) controller executing on the safety island 6, and respective arbiters executing on the QM cluster 2 and the ASIL cluster 4.

To support this operation, the management circuit (partition manager) 12 further comprises appropriate configuration interfaces, e.g., and in an embodiment, in the form of appropriate sets of configuration registers, that can be respectively accessed and set by the controller on the safety island 6 and the arbiters on the CPU clusters. The controller and arbiters can correspondingly set their configuration registers accordingly, to thereby control the management circuit (partition manager) 12 to configure the graphics processing resources (and in particular the configurable communications network that configures the graphics processing resources) accordingly. The management circuit (partition manager) 12 may also include one or more state machines for this purpose.

Figure 2:
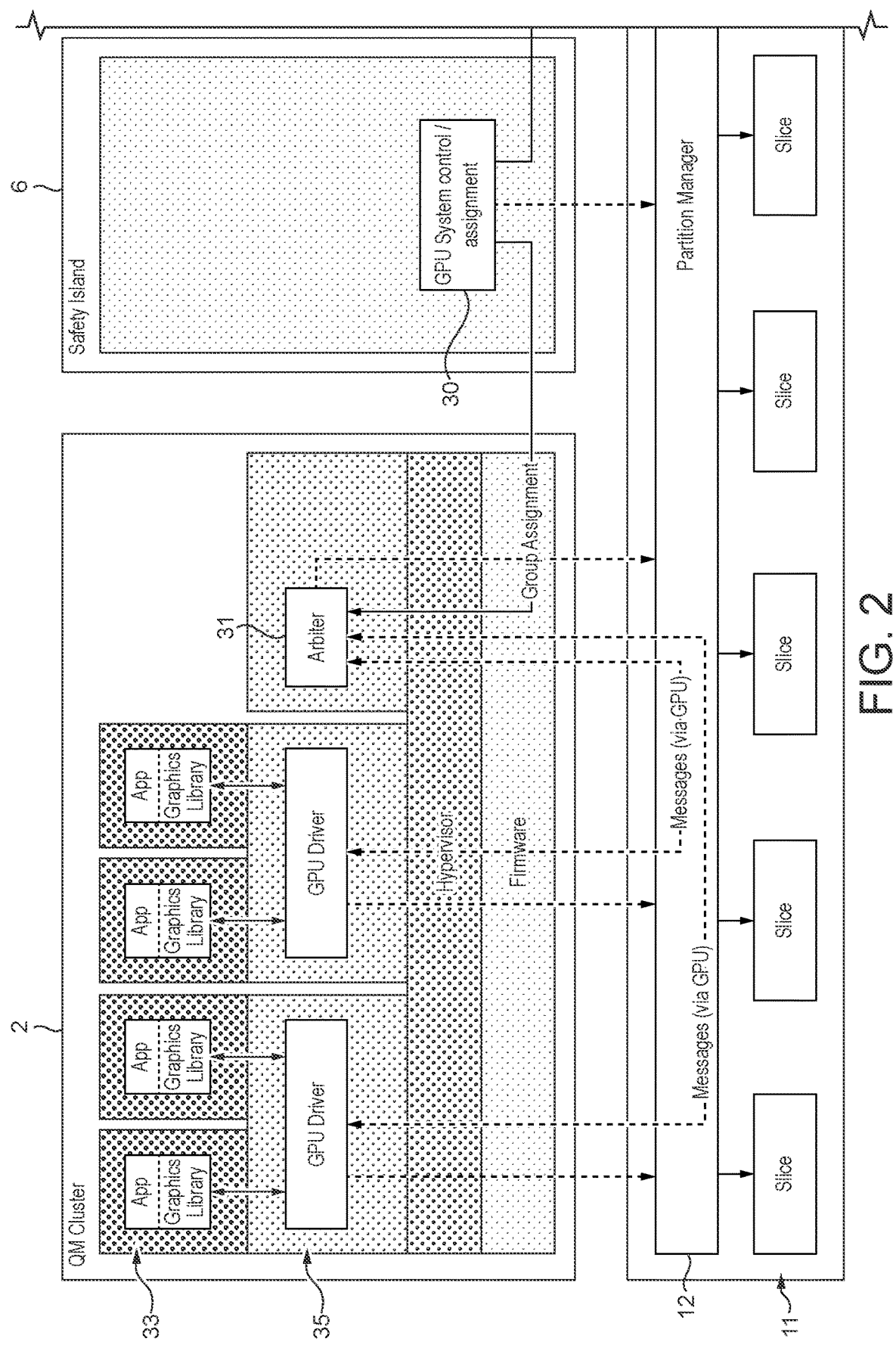
FIG. 2 shows schematically further details of the data processing system of FIG. 1.
Figure 2:
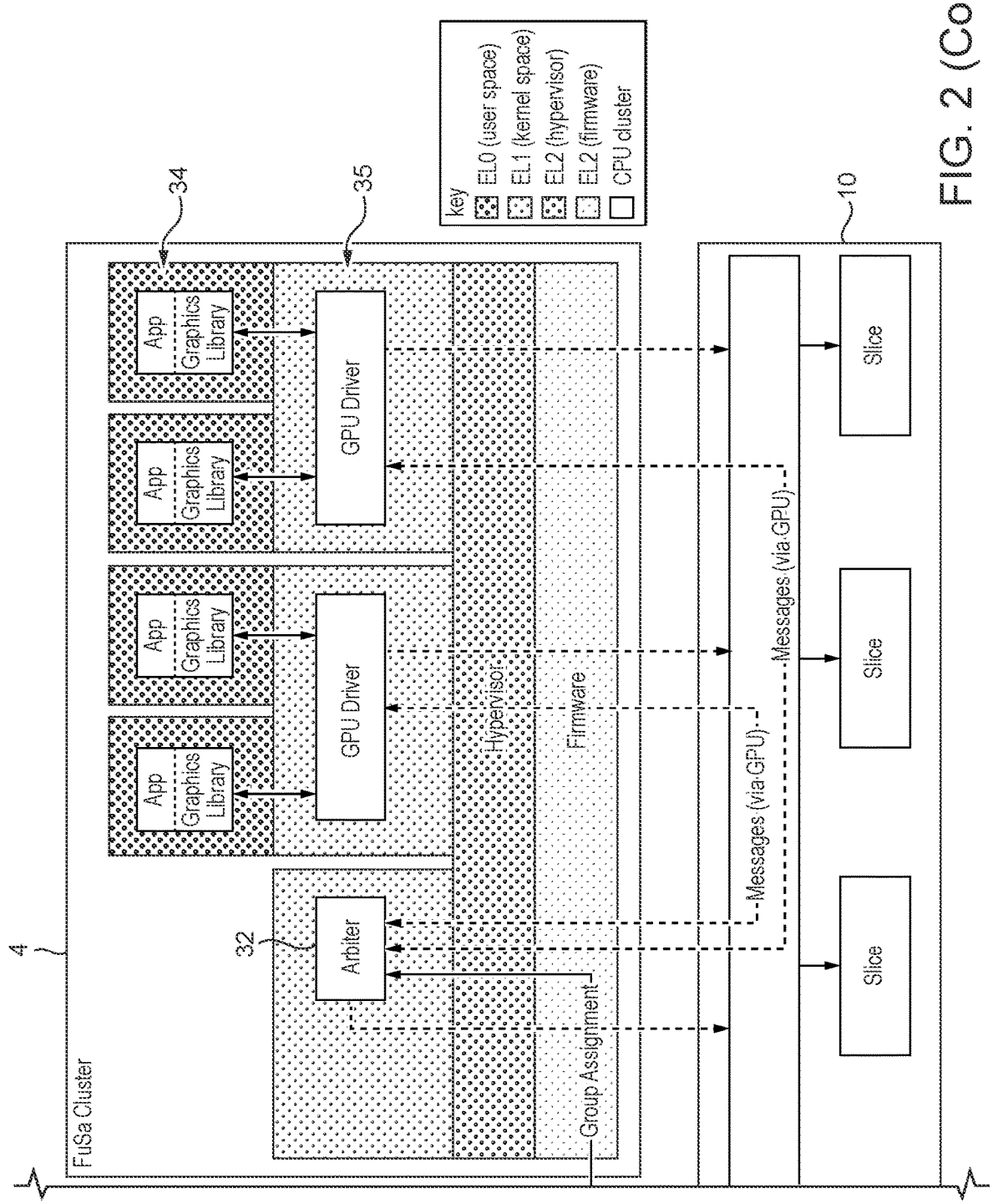

FIG. 2 illustrates this, and shows the QM cluster 2, ASIL (FuSa) cluster 4, and safety island 6, together with a (privileged) system controller 30 executing on the safety island 6, an arbiter 31 executing on the QM cluster 2, and an arbiter 32 executing on the ASIL (FuSa) cluster 4.

The arbiters 31, 32 are operable to control access by virtual machines executing on the respective clusters to the corresponding graphics processing resource group that has been allocated to that cluster. The arbiter 32 for the ASIL cluster 4 is configured to operate in and supports operation in an appropriate safety critical manner. The arbiter 31 for the QM cluster does not need to be configured to operate and support safety critical operation.

Each arbiter may operate in association with a corresponding hypervisor for managing the operation of virtual machines that is executing on the cluster in question (but is separate to the hypervisor).

FIG. 2 also shows a corresponding set of virtual machines 33 executing on the QM cluster 2, and a set of virtual machines 34 executing on the ASIL cluster 4. In this example, it is assumed that there are two virtual machines executing on each cluster, although other arrangements would, of course, be possible. Each cluster correspondingly executes an appropriate graphics processing unit (GPU) driver 35 for each virtual machine that it supports.

FIG. 2 also shows the corresponding communications links between the controller 30 and arbiters 31, 32, and from the controller 30 and arbiters 31, 32 and virtual machines 33, 34 (via the drivers 35) to the management circuit (partition manager) 12 of the graphics processing unit cluster 10.

The controller 30 is able to assign to each "resource group" that it configures, one or more graphics processing units of the set of graphics processing units 10, one or more of the partitions that the partition manager 11 supports, and one or more of the access windows that the partition manager supports. Each group is also assigned to a respective one of the "cluster" communication buses 18 and 19, in dependence upon whether the group is to be used by the QM cluster 2 (in which case it will be assigned to the corresponding QM cluster bus 18) or by the ASIL cluster 4 (in which case it will be assigned to the ASIL bus 19).

In order to configure the respective groups of graphics processing resources that are to be made available to the QM cluster 2 and ASIL cluster 4, the controller 30 on the safety island 6 sets appropriate configuration parameters in the (privilege-restricted) configuration registers of the management circuit (partition manager) 12, in response to which the management circuit 12 configures the communications network for the graphics processing unit (slices) 11 accordingly. As shown in FIGS. 1 and 2, the controller 30 communicates with the management circuit (partition manager) 12 directly, via the restricted configuration bus 20.

Figure 3:
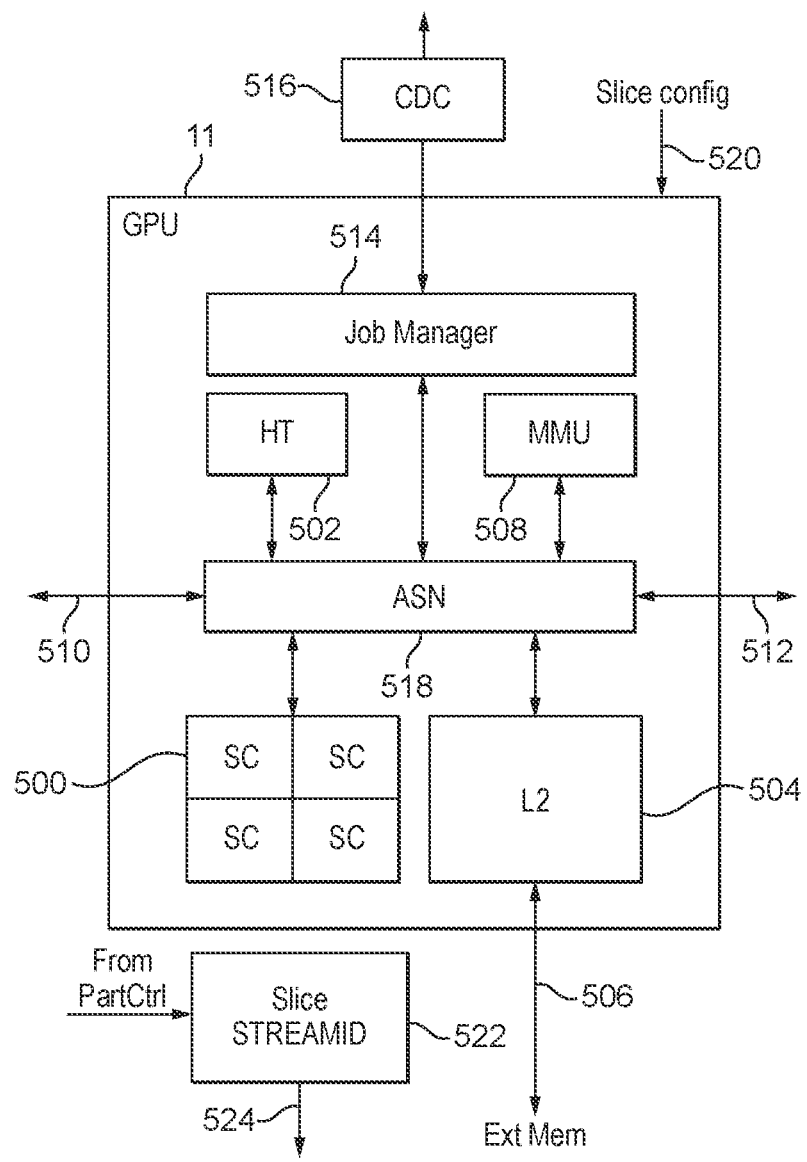
FIG. 3 shows schematically and in more detail components of a graphics processing unit in an embodiment.

FIG. 3 shows in more detail the arrangement and components of each graphics processing unit (slice) 11 in this embodiment.

As shown in FIG. 3, in this embodiment, each graphics processing unit (slice) comprises one or more execution units, such as programmable processing (shader) cores 500 (SC) and a hierarchical tiler 502 (HT). In this embodiment, each graphics processing unit is tile-based. Different graphics processing units 11 may have different sets of execution units, and there are more possible types of execution units than those shown in FIG. 3.

Each graphics processing unit also includes a level 2 cache 504 (L2) that inputs data to be used in the data processing tasks and outputs the resultant output data via a cache interface 506. The cache interface 506 is connected to external system memory 116 via a suitable memory interconnect. The graphics processing units may also include a memory management unit (MMU) 508, but this may also or instead be located externally to the graphics processing units.

Each graphics processing unit 11 also includes one or more communication bridges comprising a slave bridge 510 for connecting to a master graphics processing unit (the master graphics processing unit may be connected directly, or through a daisy-chain of other slave graphics processing units), and/or a master bridge 512 for connecting to slave graphics processing units. The master bridge 512 is used in master mode to connect one or more slave graphics processing units (through daisy-chaining), and may also be used in slave mode to connect further daisy-chained slave graphics processing units.

In the present embodiment, the communication bridges 510, 512 are implemented to support an asynchronous interface between graphics processing units, as this allows easier physical implementation of the graphics processing units as the clock can then be independent when the graphics processing units are linked.

Each graphics processing unit also includes a job manager 514. This provides the software interface for the graphics processing unit 11, and thus receives via a task interface 516 tasks (commands and data) for a virtual machine from a driver running on CPU cluster in question, and divides a task given by the driver into subtasks and distributes the subtasks for execution to the various execution units (shader cores 500, tiler 502) of the graphics processing unit. Where a graphics processing unit 11 is able to operate as a master, the job manager 514 is configured to also be able to control execution units of linked slave graphics processing units. Correspondingly, for a graphics processing unit 11 that is able to operate as a slave, the job manager 514 is able to be disabled when the graphics processing unit is operating in slave mode.

As shown in FIG. 3, the various functional units, etc., of each graphics processing unit are connected to each other via an asynchronous communications interconnect 518 that carries various traffic such as memory transactions between execution units and the level 2 cache 504 (L2), subtask control traffic between the job manager 514 and execution units, and so on. As shown in FIG. 3, the asynchronous interconnect 518 also connects to the respective slave and master bridges 510, 512 of the graphics processing unit 11 and includes appropriate switches (not shown) that can be activated to enable or disable communication across (via) the bridges 510, 512 to a connected graphics processing unit.

The different operating modes of the graphics processing unit (standalone, master and slave modes) are set (enabled and disabled) by configuring the routing of the asynchronous interconnect 518 appropriately. Thus, for example, when the graphics processing unit is to operate in standalone mode, the slave and master bridges 510, 512 are disabled to prevent communication via (across) the bridges. Correspondingly, when a graphics processing unit is to act as a master, the master bridge 512 is enabled to allow communication with a connected graphics processing unit. Correspondingly, when a graphics processing unit is to act as a slave, the slave bridge 510 is enabled to allow communication with a connected graphics processing unit.

In the present embodiment, the asynchronous interconnect 518 is reconfigured by the management circuit (partition manager) 12 through a configuration interface 520 of the graphics processing unit 11. Any routing configuration (or reconfiguration) in an embodiment only happens during reset of the graphics processing unit.

Each graphics processing unit 11 also has associated with it an identifier unit 522 that stores an identifier or identifiers assigned to the (currently enabled) access window for that graphics processing unit. The identifier is provided by the management circuit 12 via an identifier interface 524 for the graphics processing unit. The graphics processing unit can then, e.g., output the identifier together with the output data from the L2 cache 504. The identifier can be used for memory access permission checking, e.g. a virtual machine and/or graphics processing unit may not be able to access data associated with another virtual machine and/or graphics processing unit because it does not know the correct identifier for accessing that data.

FIG. 3 shows an overview of the graphics processing units according to this embodiment of the technology described herein. However, it should again be noted that FIG. 3 is only schematic and that various components and connections have been omitted from that Figure for the sake of clarity.

Equally, the data processing system and/or graphics processing unit(s) of the present embodiment may include, as appropriate, one or more of the features described in US 2017/0236244, the entire contents of which is incorporated herein by reference, and/or US 2019/0056955, the entire contents of which is incorporated herein by reference.

As will be appreciated from the above, in this embodiment of the technology described herein, the graphics processing units and their associated management circuit can, in effect, be considered to be divided into three different "safety" domains, a "control" safety domain 50, comprising the main configuration control of the management circuit 12, that is owned and controlled by the "safety island" CPU cluster 6, and then two further domains, comprising a "safety critical" domain 51 that comprises a group of graphics processing resources being used by and owned by the "safety critical" ASIL CPU cluster 4, and a second, "non-safety critical" domain 52 comprising a group of graphics processing units, etc., that is to be used, and owned by the QM CPU cluster 2.

Figure 4:
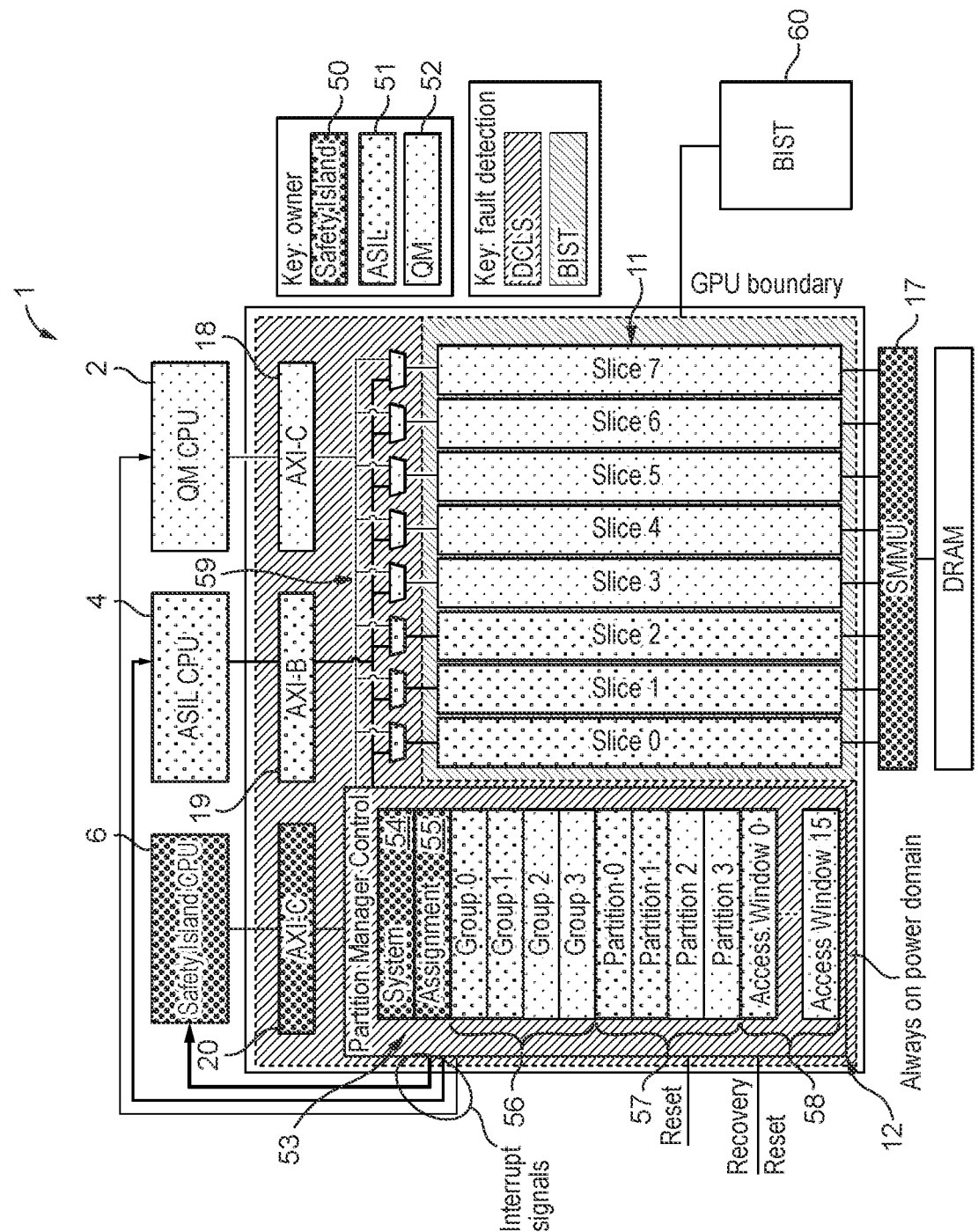
FIG. 4 shows schematically further details of an embodiment.

FIG. 4 illustrates this and shows in more detail the arrangement of the management circuit and the distribution of the "ownership" of different aspects of the management circuit and the graphics processing units between the different domains.

As shown in FIG. 4, the management circuit (partition manager) 12 includes, inter alia, a set of control interfaces (communications interfaces) 53 that may be used to control the management circuit to configure the groups of graphics processing resources, and then to use the resources in the groups. These control (communications) interfaces comprise respective address spaces and sets of registers that can be addressed by appropriate software executing on the processors (processor clusters).

These control interfaces comprise firstly a "system" interface 54 that comprises a set of control registers that may be used, for example, to set system parameters, such as the stream IDs to be used for respective access windows.

The system interface 54 may also be used (by the controller 30) to configure the fault protection and detection settings (operation), such as enabling the desired fault detection mechanisms (and their interrupts), enabling fault detection for the desired groups, partitions and graphics processing units, and/or configuring the behaviour in the event of a fault (e.g. whether fault reporting is enabled or disabled, the current operation should be terminated or continued, etc.).

There is then an "assignment" interface 55, which is used by the controller 30 on the safety island CPU cluster 6 to set the allocation of resources (so graphics processing units (slices), partitions and access windows) to the respective groups, and the allocation of the groups to the respective communications buses.

As shown in FIG. 4, these interfaces 54, 55 of the management circuit are used by and belong to the controller 30 on the safety island processor cluster 6, and are accessed via (and only accessible via) the corresponding privileged bus 20 for communicating with the safety island CPU cluster 6.

The management circuit 12 then further includes a set of "group" configuration interfaces 56, which can be used by the arbiters for the respective groups to configure the resources within the group, and in particular to configure and set up the allocation of graphics processing units and access windows to respective partitions within the groups.

As shown in FIG. 4, these group configuration interfaces are accessible to and will be accessed by the respective arbiters to which the groups have been assigned, via the corresponding communications bus for the processor cluster that the arbiter is executing on.

In the example shown in FIG. 4, it is assumed that groups 0 and 1, partitions 0 and 1, graphics processing units (slices) 0-2 and an appropriate set of access windows have been assigned to the ASIL CPU cluster 4, and so will be controlled by the corresponding arbiter 32 for that cluster via the ASIL cluster communications bus 19.

Correspondingly, groups 2-3, partitions 2-3, graphics processing units 3-7 and a suitable set of access windows have been assigned to the QM cluster 2, and so will be controlled by the arbiter 31 for that cluster over the QM cluster bus 20.

Other distributions of the resources into groups (and thus as between the CPU clusters) could be used if desired.

As well as the group configuration interfaces 56, the management circuit also provides a set of partition control interfaces 57, which may be used by the arbiter for the group of graphics processing units that the partition belongs to to, inter alia, power a partition on and off, reset the partition, and, also, and as will be discussed further below, trigger fault detection testing for the partition in question.

The management circuit 12 then finally provides, as discussed above, a set of access windows 58, to provide the communication and control interface whereby a virtual machine may access and control a partition of a group of graphics processing units that it has been allowed access to. As discussed above, the access windows also provide an appropriate message passing interface for communications between the arbiter and the virtual machine that the access window belongs to.

FIG. 4 also shows the configurable communications network 59 of the management circuit that, as discussed above, can be set under the control of the controller on the safety island 6 to configure the graphics processing units into the respective groups, and to be coupled to the appropriate one of the communication buses 19, 20, etc.

The management circuit is connected to, as discussed above, three separate communications buses that can be used to communicate with the management circuit and the graphics processing units, namely a privilege-restricted bus 20 for communicating with the safety island CPU cluster 6, a bus 19 for communicating with ASIL CPU cluster 4 and a bus 20 for communicating with the QM CPU cluster 2.

In order to further support and facilitate separation between the hardware of different groups of graphics processing units (and thus the different domains), the management circuit 12 is able to power respective partitions of graphics processing units, and individual graphics processing units within a partition of graphics processing units, on and off independently of each other, and, correspondingly, can reset a partition of graphics processing units (and individual graphics processing units within a partition), independently of each other. This is done under the control of the arbiter for the group of graphics processing units in question, via the corresponding partition interface 57.

On the other hand, as shown in FIG. 4, the management circuit itself is always powered on (and may only be powered off under the control of the system controller 30 on the safety island CPU 6). Correspondingly, the management circuit can only be reset by the system controller 30 on the safety island CPU 6. As shown in FIG. 4, in this embodiment there are two levels of "reset" that can be applied to the management circuit, a first "reset" that resets all hardware, and a second "recovery reset" that resets all hardware except for error reporting mechanisms (which may, e.g., be used when error recovery requires a reset (e.g. because a unit is unresponsive)).

Also, as shown in FIG. 4, each CPU cluster has its own, independent interrupt. In this embodiment, both the management circuit, and each partition of graphics processing units, can generate its own, independent interrupt. The interrupts are broadcast to all of the CPU clusters of the system, with the corresponding interrupt controller for each CPU cluster identifying whether the broadcast interrupt applies to it or not (is for a partition of a group of graphics units that is under its ownership in the case of the ASIL CPU cluster 4 and the QM CPU cluster 2, or is from the management circuit in the case of the safety island CPU cluster 6).

In the present embodiment, in order to further support the operation of the groups of graphics processing units in separate, "safety critical" and "non-safety critical" domains, and under the control of a "safety island" domain, the system further supports and uses appropriate fault protection mechanisms for the management circuit 12 and the graphics processing units 11.

In particular, the management circuit is permanently operated at a higher (high) level of fault protection, in this embodiment by being always and permanently subjected to a fault detection process (monitoring). This is achieved in the present embodiment by protecting the management circuit using a dual core lockstep fault detection mechanism, i.e. the management circuit is instanced twice, with one instance of the management circuit being used to check the operation of the other instance of the management circuit at all times (and such that if there is any discrepancy between them, that will be taken as indicating a fault).

The graphics processing units, on the other hand, are not protected by dual-core lockstep, but are instead able to be protected against faults using the fault detection testing process of the embodiments of the technology described herein (using built-in self-testing (BIST) as described above). In the present embodiment, and as will be discussed further below, this built-in self-testing can be selectively triggered for a graphics processing unit, under the control of the arbiter for the group of graphics processing units that the graphics processing unit belongs to. In particular, as discussed above, the arbiter can use the partition control interfaces 57 to trigger BIST fault detection testing for a partition.

This then allows the graphics processing units (and in particular respective groups of the graphics processing units) to be protected at either a higher or lower level of fault protection (i.e. either to be subject to BIST in use or not)).

In the present embodiments, BIST is used for a group of graphics processing units in dependence upon whether the group of graphics processing units is operating as part of the "safety" domain for the ASIL CPU cluster 4, or a "non-safety critical" domain for the QM CPU cluster 2.

Thus, when a graphics processing unit is part of a group that is to be used for the "safety critical" domain (ASIL CPU cluster 4), built-in self-testing is performed for the graphics processing unit, but when a graphics processing unit is part of a group that is to be used for the non-safety critical domain (i.e. to be used by the QM CPU cluster 2 in the present embodiments), then built-in self-testing is not performed for the graphics processing unit.

In this way, the groups of graphics processing units can be respectively configured as higher fault protection or lower fault protection groups of graphics processing units, and without the need to permanently protect the graphics processing units with the higher level of fault protection.

In order to facilitate this operation, the arbiter 32 for the ASIL CPU cluster 4 is configured to automatically and always cause built-in self-testing to be performed for any group of graphics processing units that it is allocated. Correspondingly, the arbiter 31 for the QM CPU cluster 2 is configured to not perform built-in self-testing for any group of graphics processing units that it is allocated. Thus the allocation of the groups of graphics processing units to the respective CPU clusters and their arbiters by the controller 30 correspondingly sets and configures whether the group of graphics processing units will be subjected to the higher level of fault protection provided by BIST or not.

It will correspondingly be understood that when a graphics processing unit is moved between domains it may correspondingly become subject to built-in self-testing (or no longer be subject to built-in self-testing), as appropriate.

As shown in FIG. 4, in order to support the use of BIST fault detection testing for the graphics processing units, the data processing system further comprises an appropriately configured BIST unit (circuit) 60. Thus when the arbiter for a group of graphics processing units indicates that a graphics processing unit should undergo a built-in self-test, that test will be performed appropriately for the graphics processing unit in question by the BIST unit.

Once the groups of graphics processing units have been configured, and allocated to respective arbiters, etc., then the group of graphics processing units for the QM CPU cluster 2 (and thus that is to be operated at the lower level of fault protection) will be operated without BIST being performed for the group of graphics processing units.

On the other hand, BIST will be performed for the group of graphics processing units that is allocated to the ASIL CPU cluster 4 (and thus is to be operated with a higher level of fault protection).

As discussed above, in the present embodiment, the arbiter 32 for the group of graphics processing units for the ASIL CPU cluster 4 will control the BIST fault detection testing of the group of graphics processing units, via the partition control interfaces 57 of the management circuit that can be set by the arbiter to trigger the fault detection testing for a partition of the graphics processing units.

Thus the arbiter 32 is able to and operates to cause respective partitions of the group of graphics processing units to be subjected to the BIST fault detection testing (can and does trigger the BIST fault detection testing for the partitions graphics processing units in its group on a partition-by-partition basis, with each partition being tested independently of the other partitions).

In the present embodiment, each graphics processing unit can be, and is, subjected to the BIST fault detection testing on its own, and independently of any other graphics processing units of the partition.

For instance, whilst FIG. 4 shows a single BIST unit (circuit) 60 for the graphics processing units, it should be appreciated that each graphics processing unit may logically have its own associated BIST unit (circuit). This may be done by appropriately configuring the BIST unit (circuit) 60 to be able to perform separate testing for the plurality of graphics processing units, or by providing a separate hardware BIST sub-controller for each graphics processing unit. Various arrangements would be possible in this regard.

Thus when a partition is tested, each graphics processing unit of the partition is tested separately.

Furthermore, the testing is done such that each of the graphics processing units in the group is (fully) tested at least once within a desired (fault detection) testing interval (diagnostic test interval) for the graphics processing unit in question (as may be specified for the data processing system and "safety critical" domain, in question).

The testing is then repeated at appropriate intervals, to ensure compliance with the required diagnostic test interval(s).

It would be possible for a graphics processing unit to be taken "offline" (put in a different hardware state, unavailable to software), and to remain "offline" for the duration of the entire testing sequence.

However, in the present embodiment, rather than doing this, the fault detection testing is instead scheduled alongside the desired graphics processing work such that the runtime testing is, in effect, interleaved with the graphics processing work, thereby allowing test coverage to accumulate over a number of frames. This approach may therefore allow a graphics processing unit to be tested alongside performing the desired processing work, and may thus provide a more efficient use of the graphics processing resource (and time), e.g. compared to running the entire fault detection test in one go, and taking the graphics processing continuously unit 'out of action' for the (entire) duration of the fault detection test.

For example, the graphics processing unit that is to be tested may be configured to render a new frame for each of a certain frame render period (which in the case where the frames are being generated for display may, e.g., be, and in an embodiment is, defined by the refresh rate of the display for which the frames are being generated, e.g. so that all frames are allotted (permitted) the same rendering period (although this need not be the case)).

That is, the graphics processor aims to complete all its graphics processing work for a frame within the frame render period, and at the end of the frame render period the graphics processor moves to the next frame.

For example, where the graphics processing unit is rendering frames for display at a rate of 60 frames per second (fps), this means there is a frame rendering period of 16.7 milliseconds available for each frame. However, the actual time for rendering a frame may be (and typically will be) shorter than this. For example, it may take only 5 milliseconds to render the frame.

In more conventional arrangements the graphics processing unit may thus draw a frame and then be idle until the start of the next frame rendering period. In contrast, in the present embodiment, these idle periods are used for runtime testing. In this way, the fault detection testing can be performed alongside the rendering of the frames, without having to take the graphics processing unit "offline" for a significant period of time, and without significantly affecting the desired graphics processing.

The testing may be (and typically will be) too long to complete within the idle period for a single frame. To address this, in the present embodiment, the fault detection test sequence is divided into a number of 'sub-tests', which can then be interleaved with the graphics processing for a plurality of frames. In this way it is possible to accumulate test coverage over the plurality of frames.

The idle period for each frame, and thus the period that may be allocated for testing (or performing sub-tests) may generally vary from frame to frame, e.g. depending on how much time is required for the graphics processing for each frame. Thus, in general the number of sub-tests that could be performed during the frame render period for each frame may vary, if the testing is done in this way.

The maximum permitted time to complete the testing (of a given instance of testing) is the diagnostic test interval. If the testing time per frame is variable, the time taken to complete the testing will also be unpredictable. However, most safety-critical devices are required to meet a specific diagnostic test interval. Therefore it may be beneficial to fix the time allocated for testing for at least some of the frames, e.g. by suspending graphics processing if necessary.

Figure 5:
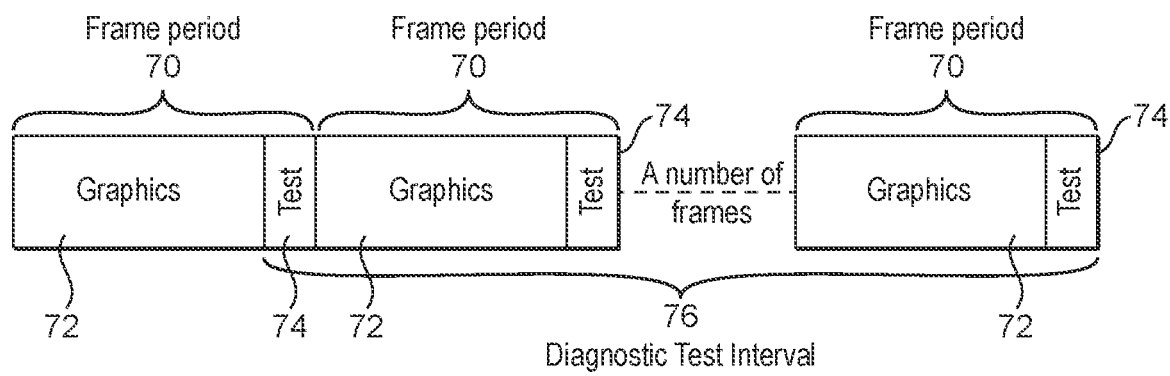
FIG. 5 shows an example of runtime testing of a graphics processing unit according to an embodiment.

An example of this is shown in FIG. 5. In the example shown in FIG. 5 there is a fixed testing window 74 that is defined for each of the frame rendering periods 70, such that a fraction of each frame rendering period is reserved for testing. In this way it is possible to guarantee a specific diagnostic test interval 76. Thus, as shown in FIG. 5, for each frame rendering period 70, the graphics processing unit first performs the desired graphics processing 72 for the current frame but also undergoes fault detecting testing during the frame rendering period 70. Testing coverage is therefore accumulated over a number of frames.

However, this means that if the graphics processing 72 for the frame that is to be generated during the frame rendering period 70 has not completed before the start of the fixed testing window 74, the graphics processing 72 may need to be suspended (stopped) to allow the fault detection testing 74 to be fitted in.

Suspending the graphics processing 72 is not ideal since in that case the graphics processing unit may need to perform an explicit suspend mechanism, which may require more state to be written out (e.g. to be able to resume graphics processing for next frame), etc.

Thus, it would also be possible to perform a more dynamic scheduling of the fault detection testing, e.g. where for the earlier frames in the sequence of frames the fault detection testing is fitted in opportunistically, e.g. in the idle periods after the graphics processing has completed, whereas for later frames in the sequence of frames, at least where there is a risk of the fault detection testing not completing within the diagnostic test interval, priority is given to fault detection testing to ensure the diagnostic test interval is met.

Figure 6:
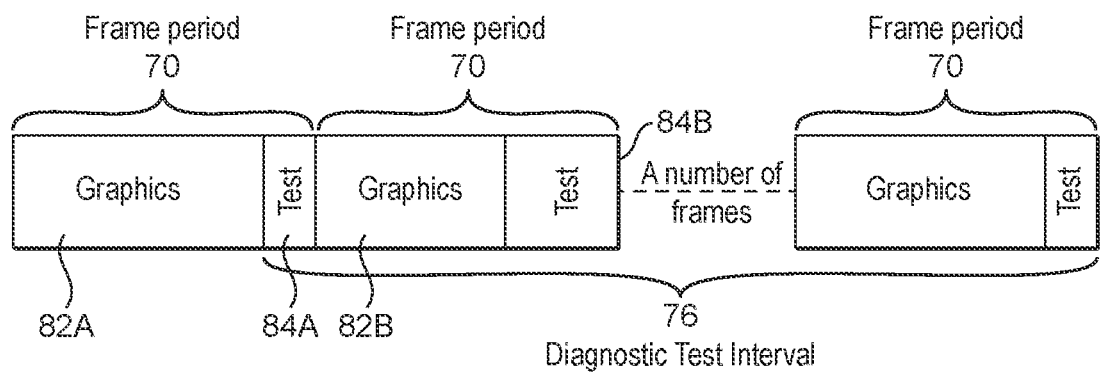
FIG. 6 shows another example of runtime testing of a graphics processing unit according to an embodiment.

An example of this approach is shown in FIG. 6. As shown in FIG. 6, for each frame rendering period 70, the graphics processing unit starts by performing the graphics processing 82A, 82B for the current frame, and then fits in functional safety testing 84A, 84B opportunistically after the graphics processing 82A, 82B has finished. This means, as shown, that different amounts of testing may be performed in different frame rendering periods.

To ensure that the diagnostic test interval is still met, the progress of the testing is therefore tracked to determine, for each frame, the proportion of the frame rendering period 70 that should be given to fault detection testing. For example, for each frame rendering period 70, an estimate is made of the time required to complete the overall test sequence, which estimate is then compared against the remaining time until the diagnostic test interval expires. If the earlier frames have not accumulated enough test coverage, e.g. such that if testing continued at the current rate the testing would not complete within the diagnostic test interval, priority may then be given to fault detection testing.

Figure 7:
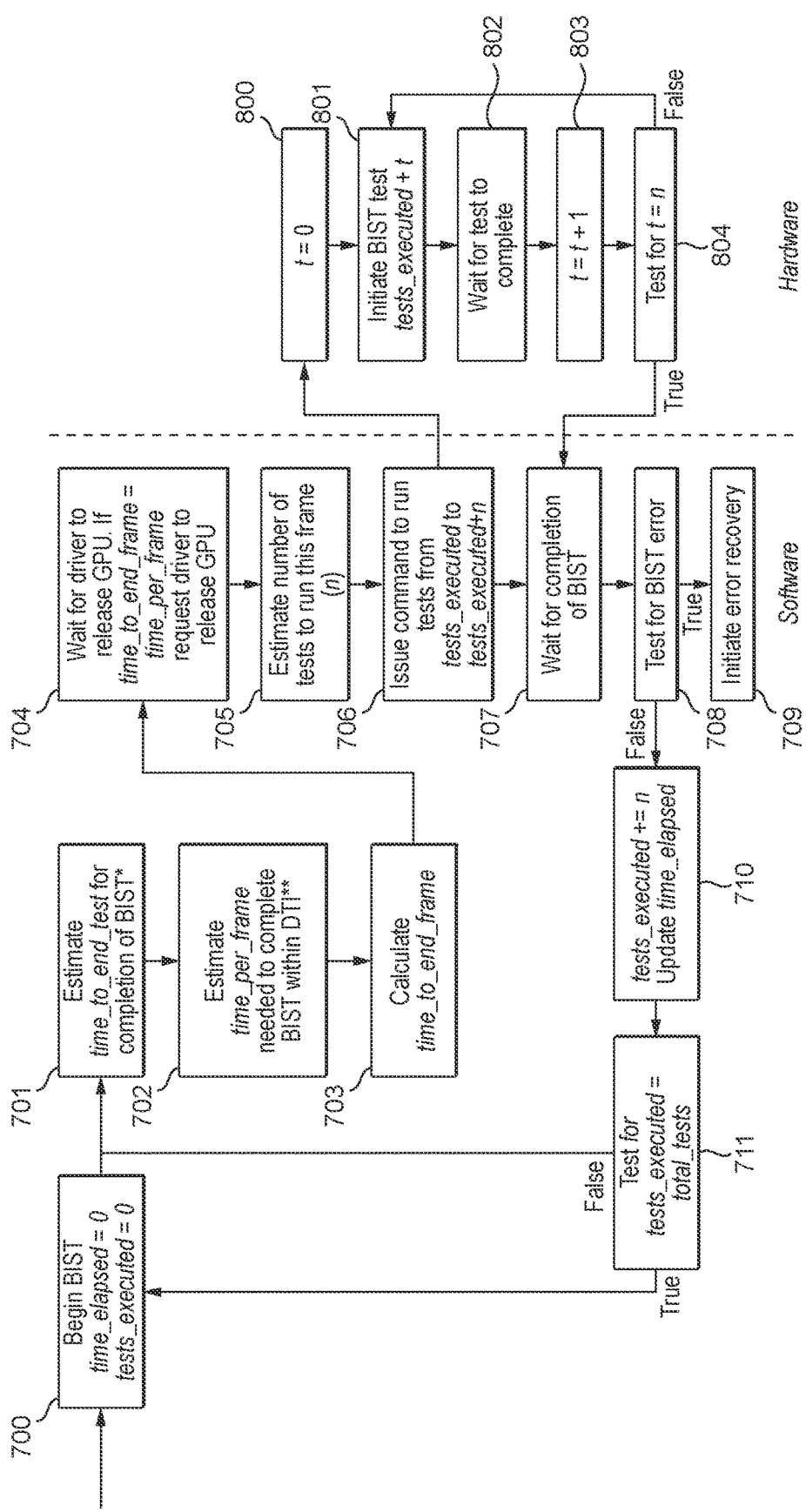
FIG. 7 is a flow chart illustrating an embodiment.

FIG. 7 is a flow chart showing the operation of the graphics processing unit according to this example when a graphics processing unit is triggered to be tested (step 700). At the start of each frame rendering period, an estimate is made of the expected time required to complete the testing (step 701), e.g. as follows:

$$\text{time\_to\_end\_test} = (\text{total\_tests} - \text{tests\_executed}) * \text{time\_per\_test}$$

An estimate is also made of the time required per frame to complete the testing within the diagnostic test interval (step 702), e.g. as follows:

$$\text{time\_per\_frame} = \text{time\_to\_end\_test} * \text{frame\_period} / (\text{diagnostic\_test\_interval} - \text{time\_elapsed})$$

The time to the end of the current frame (time_to_end_frame) is then calculated (step 703) and compared with the estimated time required per frame (time_per_frame).

So long as time_to_end_frame>time_per_frame the graphics processing unit can then be operated to perform processing work. However, if time_to_end_frame<time_per_frame priority should then be given to fault detection work, and the graphics processing unit should be released by the driver to undergo fault detection testing work (step 704).

The number of fault detection tests that are to be run in the current frame rendering period (n) is then estimated (step 705) and the arbiter issues a command to the BIST unit (circuit) to run a BIST sub-test comprising a number of tests from tests_executed to tests_exectuted+n. The software then waits for completion of the BIST sub-test (step 707), tests whether or not there an error (step 708) and then either initiates error recovery (step 709) or allows the processing to continue, e.g. by updating the number of tests executed and time elapsed (step 710), and so long as the number of tests executed is lower than the total required tests (step 711), the process is then repeated for the next frame rendering period and so on.

The BIST testing itself is in this embodiment performed in hardware (in the BIST unit (circuit)) as shown in FIG. 7. Thus, when the BIST sub-test is triggered, at t=0 (step 800), the hardware circuit initiates the next BIST test (tests_executed+t, step 801), waits for the test to complete (step 802), and then increments the counter t (step 803). This process is then repeated until the counter t is equal to the number of scheduled tests n (step 804), at which point the BIST sub-test is complete and the process continues as described above.

In this case it will be appreciated that where priority is given to fault detection testing for a frame rendering period, the graphics processing for rendering the frame itself may not complete, such that for that frame rendering period the frame may not be generated (and so the display cannot be updated). In that case, the previous frame may be re-displayed. This may be tolerable since if only a single frame is missing this may be barely perceptible to a user.

Figure 8:
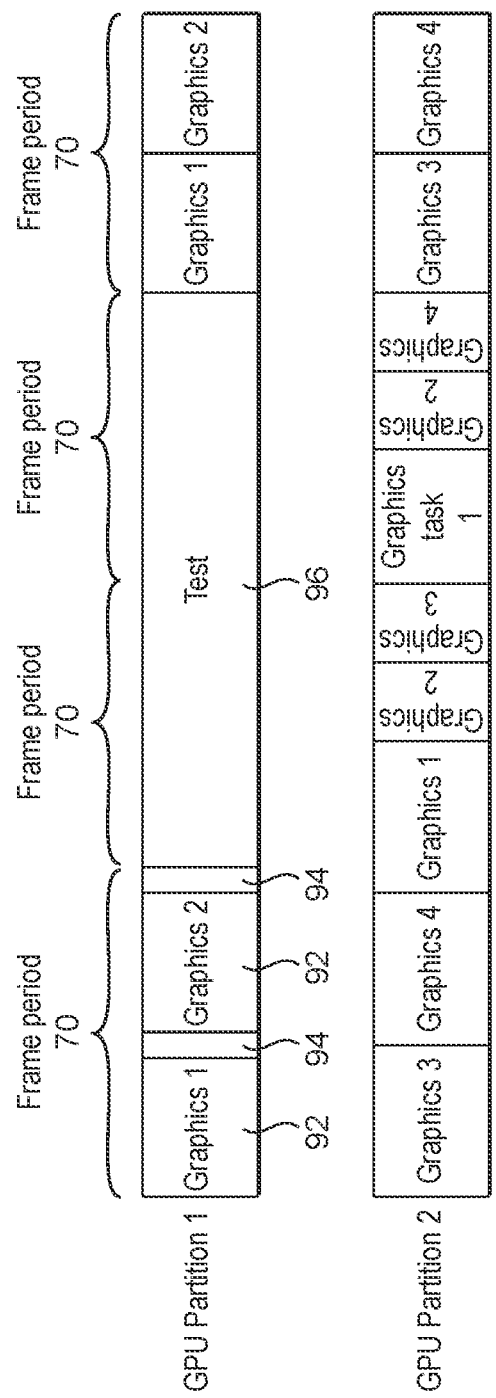
FIG. 8 shows an example of how processing work can be moved between processing units to facilitate runtime testing.

However, where there are other graphics processing units (or graphics processing unit partitions) available to perform processing work, the processing work may instead be moved to another graphics processing unit (partition) to allow the frame generation to complete. An example of this is shown in FIG. 8. As shown in FIG. 8, for the first graphics processing unit (partition) being tested, in a first frame rendering period 70 a mixture of processing work 92 and fault detection testing 94 is performed. However, in this example, priority is then given to fault detection testing (e.g. to ensure the diagnostic test interval is met), such that for the next two frame rendering periods 70 no processing work is done, and the graphics processing unit instead undergoes fault detection testing 96 only. In this case, the processing work for those frames is moved to a second graphics processing unit (partition) such that the frames can still be updated for display.

In other embodiments rather than moving processing to another partition, the graphics processing unit may reduce quality of frame generation (e.g. by rendering at a lower resolution) and/or reduce the desired display rate to free up more time for BIST sub-tests. Various arrangements would be possible in that regard.

The present embodiment thus supports BIST testing of the graphics processing unit by scheduling (time-slicing) BIST testing work with the desired graphics processing work. In this way the BIST testing can be performed across multiple frames, allowing for a more efficient scheduling of the BIST testing for the graphics processor.

The (testing) process is done (repeatedly) for each partition such that, as discussed above, all of the partitions are repeatedly tested within a required diagnostic test interval.

As discussed above, if the BIST testing is passed by a partition, then the partition is re-enabled for use. On the other hand, if a partition fails the BIST testing, then an (appropriate) fault detection event action is performed. This may be done, e.g., by the management circuit, and/or by the BIST circuit (unit), and could comprise, for example, performing some form of error recovery operation and/or reporting the fault to another component of the system, such as the controller, for handling. In the event of a fault, the graphics processing unit and/or partition may, e.g., be reset, and/or may enter a particular, e.g. pre-set "safe" mode of operation. As discussed above, the operation in the event of the BIST testing being failed may be configured by the management circuit, e.g. under the control of the controller.

(Correspondingly, if the dual core lock step fault detection monitoring of the management circuit should detect a fault, then again an appropriate fault detection event action is in an embodiment performed, such as the management circuit performing some form of error recovery operation, and/or reporting the fault to another component of the system, such as the controller, for handling. For example, in the event of a fault, some or all of the system may, e.g. be reset, and/or the system may enter a particular, e.g. pre-set, "safe" mode of operation.)

Whilst in the embodiment described above there are a plurality of graphics processing units (slices) the technology described herein is of course also applicable to more conventional graphics processing systems including a single graphics processing unit.

Figure 9:
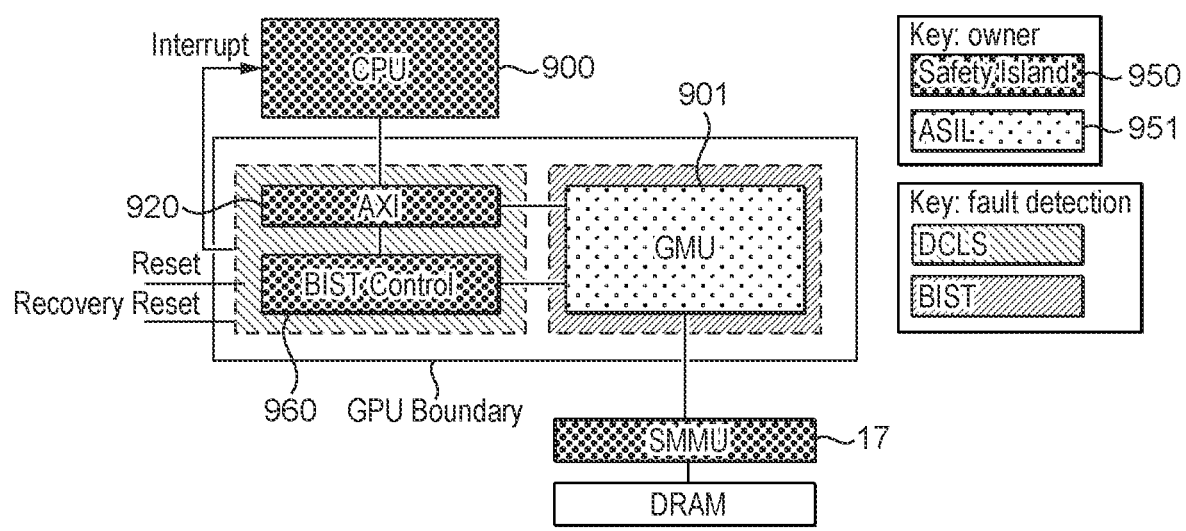
FIG. 9 shows schematically and in more detail components of a graphics processing unit in an embodiment.

FIG. 9 shows an example of a data processing system including a single graphics processing unit 901 operable to perform processing work under the control of CPU 900, which communicates with the graphics processing unit 901 via bus 920. As shown, the graphics processing unit 901 also communicates with external memory via a suitable MMU 17, e.g. in a similar manner as described above. A BIST controller 960 is provided for the graphics processing unit 901 that allows the graphics processing unit 901 to be tested, e.g. in the manner described above, e.g. in relation to FIGS. 5, 6 and 7 (but there is now no possibility for moving processing work to another graphics processing unit (partition)).

Furthermore, whilst various embodiments are described above in the relation to graphics processing, it will be appreciated that the technology described herein may also suitably be applied to any other instances of data processing (and data processing units) that may need to be periodically tested, as desired.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system comprising:
a processing unit operable to process data to generate a sequence of outputs, wherein the processing unit is configurable, when generating the sequence of outputs, such that data processing for generating each output in the sequence of outputs will be performed within a respective processing period for the output; and
a controller for the processing unit, wherein the controller is configured to cause the processing unit, when generating the sequence of outputs, during respective processing periods for a plurality of outputs in the sequence of outputs, to also undergo one or more fault detection tests such that, for at least one output of the plurality of outputs, both processing of data for the at least one output and fault detection testing is performed during respective processing periods for the at least one output;
wherein performing fault detection testing comprises performing a diagnostic test sequence comprising a plurality of the fault detection tests, wherein the fault detection tests are distributed across the processing periods for multiple outputs in the sequence of outputs such that the diagnostic test sequence is completed within a defined diagnostic test interval;
wherein the controller is configured to dynamically control the processing unit to perform processing work or fault detection testing to ensure that the diagnostic test sequence is completed within the defined diagnostic test interval;
wherein the controller is configured to initially control the processing unit to prioritise processing work, and further configured to prioritise fault detection testing over the processing work to ensure the diagnostic test sequence is completed within the defined diagnostic test interval; and
wherein, in order to prioritise fault detection testing, the controller is configured to accelerate the processing work.

2. The data processing system of claim 1, wherein the fault detection tests comprise: built-in self-testing fault detection tests or software library testing fault detection tests.

3. The data processing system of claim 1, wherein for each processing period, the controller is configured to estimate a time required to complete the fault detection testing and to compare the estimated time against a remaining time until the diagnostic test interval expires, and to schedule a number of fault detection tests for the processing period accordingly based on this comparison.

4. The data processing system of claim 3, wherein the controller is configured to determine, for each processing period, a fault detection testing window required to complete the fault detection testing, and wherein when the time remaining in a current processing period is equal to or less than the determined fault detection testing window for the processing period, the controller gives priority to fault detection testing work.

5. The data processing system of claim 1, including a plurality of processing units, and wherein when the controller causes processing work for a particular one of the processing units to be interrupted so that the processing unit can perform fault detection testing, the processing work for the processing unit that is performing the fault detection testing is moved to another processing unit.

6. The data processing system of claim 1, including a plurality of processing units arranged in a group, wherein the plurality of processing units arranged in the group are themselves able to be configured as respective partitions of processing units within the group, with each partition comprising a subset of one or more of the processing units of the group, and wherein the data processing system is operable to move processing from a first partition to another partition to allow the first partition to undergo fault detection testing.

7. The data processing system of claim 1, wherein the processing unit is a graphics processing unit that is operable to render a sequence of frames, and wherein the respective processing periods correspond to a desired refresh rate at which the frames are to be updated.

8. A data processing system comprising:
a plurality of processing units, wherein each of the plurality of processing units is operable to process data to generate a sequence of outputs, wherein the processing units are configurable, when generating the sequence of outputs, such that data processing for generating each output in the sequence of outputs will be performed within a respective processing period for the output; and
a controller for the processing unit, wherein the controller is configured to cause the processing unit of the plurality of processing units, when generating the sequence of outputs, during respective processing periods for a plurality of outputs in the sequence of outputs, to also undergo one or more fault detection tests such that, for at least one output of the plurality of outputs, both processing of data for the at least one output and fault detection testing is performed during respective processing period for the at least one output;
wherein performing fault detection testing comprises performing a diagnostic test sequence comprising a plurality of the fault detection tests, wherein the fault detection tests are distributed across the processing periods for multiple outputs in the sequence of outputs such that the diagnostic test sequence is completed within a defined diagnostic test interval;
wherein the controller is configured to dynamically control the processing unit to perform processing work or fault detection testing to ensure that the diagnostic test sequence is completed within the defined diagnostic test interval;
wherein the controller is configured to initially control the processing unit to prioritise processing work, but is operable to prioritise fault detection testing over the processing work to ensure the diagnostic test sequence is completed within the defined diagnostic test interval; and
wherein the controller is configured to interrupt processing work for the processing unit to perform fault detection testing to ensure the diagnostic test sequence is completed within the defined diagnostic test interval, and
wherein when the controller is further configured to cause processing work for a particular one of the processing units to be interrupted so that the processing unit can perform fault detection testing, the controller is configured to move the processing work for the processing unit that is performing the fault detection testing to another processing unit of the plurality of processing units.

9. A data processing system comprising:
a processing unit operable to process data to generate a sequence of outputs, wherein the processing unit is configurable, when generating the sequence of outputs, such that data processing for generating each output in the sequence of outputs will be performed within a respective processing period for the output; and
a controller for the processing unit, wherein the controller is configured to cause the processing unit, when generating the sequence of outputs, during respective processing periods for a plurality of outputs in the sequence of outputs, to also undergo one or more fault detection tests such that, for at least one output of the plurality of outputs, both processing of data for the at least one output and fault detection testing is performed during respective processing period for the at least one output;
wherein performing fault detection testing comprises performing a diagnostic test sequence comprising a plurality of the fault detection tests, wherein the fault detection tests are distributed across the processing periods for multiple outputs in the sequence of outputs such that the overall diagnostic test sequence is completed within a defined diagnostic test interval; and
wherein a fixed testing window is defined for each processing period, such that if processing of data for an output has not completed before a start of the fixed testing window defined for the output's processing period, the processing for the output is interrupted such that the processing unit can undergo the one or more fault detection tests.

* * * * *

UNITED STATES PATENT AND TRADEMARK OFFICE
CERTIFICATE OF CORRECTION

| | |
|---|---|
| PATENT NO. | : 11,907,056 B2 |
| APPLICATION NO. | : 17/455609 |
| DATED | : February 20, 2024 |
| INVENTOR(S) | : Eamonn Quigley et al. |

It is certified that error appears in the above-identified patent and that said Letters Patent is hereby corrected as shown below:

In the Claims

Column 32, Line 58 Claim 9, replace "the overall diagnostic" with --the diagnostic--

Signed and Sealed this
Twenty-sixth Day of March, 2024

Katherine Kelly Vidal
*Director of the United States Patent and Trademark Office*